US008266065B2

(12) United States Patent
Dilip et al.

(10) Patent No.: US 8,266,065 B2
(45) Date of Patent: *Sep. 11, 2012

(54) METHOD AND APPARATUS FOR MANAGING TRANSACTIONS

(75) Inventors: Venkatachari Dilip, Cupertino, CA (US); Sanjeev Dheer, Scarsdale, NY (US); Amir Sunderji, San Jose, CA (US); Param Singh, Mountain View, CA (US)

(73) Assignee: Cashedge, Inc., New York, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/949,006

(22) Filed: Nov. 30, 2007

(65) Prior Publication Data
US 2008/0086426 A1 Apr. 10, 2008

Related U.S. Application Data

(62) Division of application No. 10/040,929, filed on Dec. 31, 2001.

(51) Int. Cl.
*G06Q 20/00* (2012.01)
(52) U.S. Cl. .......... 705/67; 705/1; 705/26; 705/35; 705/39; 705/45
(58) Field of Classification Search ............. 705/1–79
See application file for complete search history.

(56) References Cited

U.S. PATENT DOCUMENTS

| 4,346,442 A | 8/1982 | Musmanno |
|---|---|---|
| 4,694,397 A | 9/1987 | Grant et al. |
| 5,481,720 A | 1/1996 | Loucks et al. |
| 5,644,727 A | 7/1997 | Atkins |
| 5,745,706 A | 4/1998 | Wolfberg et al. |
| 5,787,427 A | 7/1998 | Benantar et al. |
| 5,805,719 A | 9/1998 | Pare, Jr. et al. |
| 5,826,243 A | 10/1998 | Musmanno et al. |
| 5,855,020 A | 12/1998 | Kirsch |
| 5,884,285 A | 3/1999 | Atkins |
| 5,893,078 A | 4/1999 | Paulson |
| 5,895,838 A | 4/1999 | Harjunmaa et al. |
| 5,940,809 A | 8/1999 | Musmanno et al. |
| 6,012,048 A | 1/2000 | Gustin et al. |
| 6,018,722 A | 1/2000 | Ray et al. |
| 6,021,397 A * | 2/2000 | Jones et al. ............... 705/36 R |
| 6,038,603 A | 3/2000 | Joseph |
| 6,058,378 A | 5/2000 | Clark et al. |

(Continued)

FOREIGN PATENT DOCUMENTS
GB 2392262 A 2/2004
(Continued)

OTHER PUBLICATIONS

Dartmouth Research & Consulting Glossaries, 2000 (pp. 1-9).
(Continued)

*Primary Examiner* — Pierre Eddy Elisca
*Assistant Examiner* — Shahid Kamal
(74) *Attorney, Agent, or Firm* — Sutherland Asbill & Brennan LLP

(57) ABSTRACT

A system receives account access information from a user. The account is then accessed using the received access information. Data is harvested from a web page associated with the account or received from another financial data source. The user's ability to access the account is authenticated based on the obtained information.

10 Claims, 22 Drawing Sheets

U.S. PATENT DOCUMENTS

| | | | |
|---|---|---|---|
| 6,108,641 A | 8/2000 | Kenna et al. | |
| 6,108,788 A | 8/2000 | Moses et al. | |
| 6,199,077 B1 | 3/2001 | Inala et al. | |
| 6,226,623 B1 | 5/2001 | Schein et al. | |
| 6,240,399 B1 | 5/2001 | Frank et al. | |
| 6,317,783 B1 | 11/2001 | Freishtat et al. | |
| 6,321,334 B1 | 11/2001 | Jerger et al. | |
| 6,324,523 B1 | 11/2001 | Killeen, Jr. et al. | |
| 6,374,231 B1 | 4/2002 | Bent et al. | |
| 6,381,592 B1 | 4/2002 | Reuning | |
| 6,405,245 B1 | 6/2002 | Burson et al. | |
| 6,412,073 B1 | 6/2002 | Rangan | |
| 6,473,800 B1 | 10/2002 | Jerger et al. | |
| 6,505,171 B1 * | 1/2003 | Cohen et al. | 705/26 |
| 6,510,451 B2 | 1/2003 | Wu et al. | |
| 6,513,019 B2 | 1/2003 | Lewis | |
| 6,567,850 B1 | 5/2003 | Freishtat et al. | |
| 6,594,766 B2 | 7/2003 | Rangan et al. | |
| 6,598,028 B1 | 7/2003 | Sullivan et al. | |
| 6,606,606 B2 | 8/2003 | Starr | |
| 6,609,113 B1 * | 8/2003 | O'Leary et al. | 705/39 |
| 6,609,128 B1 | 8/2003 | Underwood | |
| 6,633,910 B1 | 10/2003 | Rajan | |
| 6,697,860 B1 | 2/2004 | Kung | |
| 6,721,716 B1 * | 4/2004 | Gross | 705/40 |
| 6,748,367 B1 * | 6/2004 | Lee | 705/66 |
| 6,792,082 B1 | 9/2004 | Levine | |
| 6,799,167 B1 | 9/2004 | Gullen et al. | |
| 6,802,042 B2 | 10/2004 | Rangan et al. | |
| 7,013,310 B2 | 3/2006 | Messing et al. | |
| 7,031,939 B1 | 4/2006 | Gallagher | |
| 7,185,193 B2 * | 2/2007 | Watanabe et al. | 713/155 |
| 7,266,684 B2 * | 9/2007 | Jancula | 713/156 |
| 7,430,537 B2 | 9/2008 | Templeton | |
| 7,469,341 B2 * | 12/2008 | Edgett et al. | 713/176 |
| 2002/0010768 A1 | 1/2002 | Marks et al. | |
| 2002/0019753 A1 | 2/2002 | Boden | |
| 2002/0111919 A1 * | 8/2002 | Weller et al. | 705/67 |
| 2002/0152313 A1 * | 10/2002 | Nishimura et al. | 709/227 |
| 2006/0015450 A1 | 1/2006 | Guck et al. | |
| 2009/0055327 A1 * | 2/2009 | Jones et al. | 705/36 R |
| 2009/0076966 A1 * | 3/2009 | Bishop et al. | 705/67 |

FOREIGN PATENT DOCUMENTS

| | | |
|---|---|---|
| JP | 10149404 A | 6/1998 |
| WO | WO 97-19406 A1 | 5/1997 |
| WO | WO 01-88674 A2 | 11/2001 |

OTHER PUBLICATIONS

Bruce Schneier, Applied Cryptography, Second Edition, Protocols, Algorithms, and Source Code in C, pp. 30-32.

* cited by examiner

| Financial Institution Name | ABA and Routing Info | Internet URL | Account Offerings | Acct Type | Account Interest Rate | Minimum Account Balance |
|---|---|---|---|---|---|---|
| Bank of America | xxxxxxxxx xxxxxxxxx | www.bofa.com | Savings | Asset | 2.00 | Min. 200.00 |
| | | | Non-Intereset Checking | Asset | 0.00 | Min. 100.00 |
| | | | Interest Checking | Asset | 1.50 | Min. 1000.00 |
| | | | CD - 3 Months | Asset | 5.00 | Min. 500.00 |
| | | | Home Equity | Debt | 12.50 | N/A |
| | | | Credit Card | Debt | 18.00 | N/A |
| | | | Overdraft Protection | Debt | 16.00 | N/A |
| Charles Schwab | xxxxxxxxx xxxxxxxxx | www.schwab.com | Money Market | Asset | 4.75 | Min. 2000.00 |
| | | | ABC Mutual Fund | Asset | N/A | Min. 1000.00 |
| ... | ... | ... | ... | ... | ... | ... |

| Customer Name | Financial Institution | Account Number, Username, P/W | Active Accounts | Account Balance | User Preferences |
|---|---|---|---|---|---|
| John Smith | Bank of America | xxxxxxxx xxxxxxx xxxxxx | Savings | 2208.63 | Make all recommendations; Maintain minimum balance of $1500 in Interest Checking; Do not transfer more than $4000 per week; Pay down Overdraft Protection first; Do not withdraw funds from Rainbow Credit Union Savings account. |
| | Bank of America | xxxxxxxx xxxxxxx xxxxxx | Intereset Checking | 4126.87 | |
| | Bank of America | xxxxxxxx xxxxxxx xxxxxx | Home Equity | 12,240.32 | |
| | Bank of America | xxxxxxxx xxxxxxx xxxxxx | Credit Card | 3,566,45 | |
| | Bank of America | xxxxxxxx xxxxxxx xxxxxx | Overdraft Protection | 821.54 | |
| | Charles Schwab | xxxxxxxx xxxxxxx xxxxxx | Money Market | 3628.94 | |
| | Rainbow Credit Union | xxxxxxxx xxxxxxx xxxxxx | Savings | 562.34 | |
| Jane Doe | Bank One | xxxxxxxx xxxxxxx xxxxxx | Savings | 261.79 | Do not recommend opening new accounts. |
| | Bank One | xxxxxxxx xxxxxxx xxxxxx | Non-Interest Checking | 8245.21 | |
| ... | ... | ... | ... | ... | ... |

METHOD AND APPARATUS FOR MANAGING TRANSACTIONS

RELATED APPLICATIONS

This application is a division of application Ser. No. 10/040,929, filed Dec. 31, 2001, which is a continuation-in-part of co-pending application Ser. No. 09/665,919, filed Sep. 20, 2000.

TECHNICAL FIELD

The present invention relates to the handling of transactions, such as financial transactions and, more particularly, to the management of risks and the authentication of information associated with various transactions.

BACKGROUND

Customers of financial institutions (both individual customers and businesses) typically maintain multiple financial accounts at one or more financial institutions. Financial institutions include, for example, banks, savings and loans, credit unions, mortgage companies, lending companies, and stock brokers. A customer's financial accounts may include asset accounts (such as savings accounts, checking accounts, certificates of deposit (CDs), mutual funds, bonds, and equities) and debt accounts (such as credit card accounts, mortgage accounts, home equity loans, overdraft protection, and other types of loans).

In many situations, a user's asset accounts may not be earning the best available interest rate or the user's debt accounts my not be at the most competitive interest rate. It would be to the user's benefit to adjust the funds between different accounts to maximize the interest earned in the asset accounts and/or minimize the interest paid in the debt accounts. For example, a user may have a checking account that pays no interest, but has a high balance. A portion of the funds in the checking account could be transferred to a savings account or other asset account that pays interest on the funds in the account. Similarly, a user with a high credit card balance could save money if a portion of the credit card balance was transferred to a home equity line of credit at a lower interest rate.

If a user identifies funds to be transferred between different accounts, the user is then required to execute the necessary transactions. To execute these transactions, the user may need to visit one or more financial institutions and request the appropriate fund transfers. However, if one or more of the financial institutions is located in a distant town, the fund transfers may need to be processed by check or bank wire. Alternately, the user may execute some of the transactions through an online banking service, if the financial institution supports online banking. However, typical online banking services do not permit the transfer of funds between two different financial institutions. Thus, if a user wants to transfer funds, for example, from a checking account at a bank to a money market account at a stock broker, the user cannot generally execute the transfer using online banking.

Instead, the user needs to withdraw funds manually using, for example, a check and manually deposit the funds in the second account (either in person or by mail). Since the second account may place a hold on the deposit, the actual fund transfer may not occur for a week (or longer) depending on the amount of the check, the policies of the financial institutions, and any delays involved with mailing the check. A bank wire provides a faster method of transferring funds between financial institutions, but is not generally cost-effective for small transfers (e.g., transfers of less than a few thousand dollars), due to the costs associated with the bank wire. For small transfers, the costs associated with the bank wire may exceed the interest savings generated by the transfer.

Furthermore, to execute a particular transaction between two financial institutions that support the online transfer of funds, the user must configure a particular transaction for each possible combination of accounts that may have funds transferred between them. This is tedious and requires the user to remember the differences between the online interfaces at the different financial institutions.

If a user's financial institutions support online transfers of funds, before performing any transfers between two financial institutions that support the online transfer of funds, the user must configure a particular transaction for each possible combination of accounts that may have funds transferred between them. This is tedious and requires the user to remember the differences between the online interfaces at the different financial institutions.

Prior to implementing any financial transaction for a particular user or involving a particular account, it is important to authenticate the user requesting the transaction, authenticate that user's ability to implement the requested transaction, and understand any risks involved with the user, the requested transaction, or the accounts involved in the requested transaction. The systems and procedures available today do not provide a convenient mechanism for transferring funds between accounts at different financial institutions.

The systems and methods described herein addresses these and other problems by performing user authentication and risk analysis based on the accounts and the users or entities involved in the requested transaction.

SUMMARY

A particular embodiment receives financial account access information from a user. Information is obtained regarding the financial account from a financial data source. The user's ability to access the financial account is authenticated based on the obtained information.

Another embodiment receives account information from a user. The account is accessed using the received access information. Data is harvested from a web page associated with the account. The user's ability to access the account is authenticated based on the obtained information.

In a described implementation, the authentication information includes a user name and an associated password for accessing the particular account.

BRIEF DESCRIPTION OF THE DRAWINGS

FIG. 12 is a table illustrating various information associated with different financial institutions.

FIG. 13 is a table illustrating various customer information related to financial accounts and user preferences.

DETAILED DESCRIPTION

Figure 1:
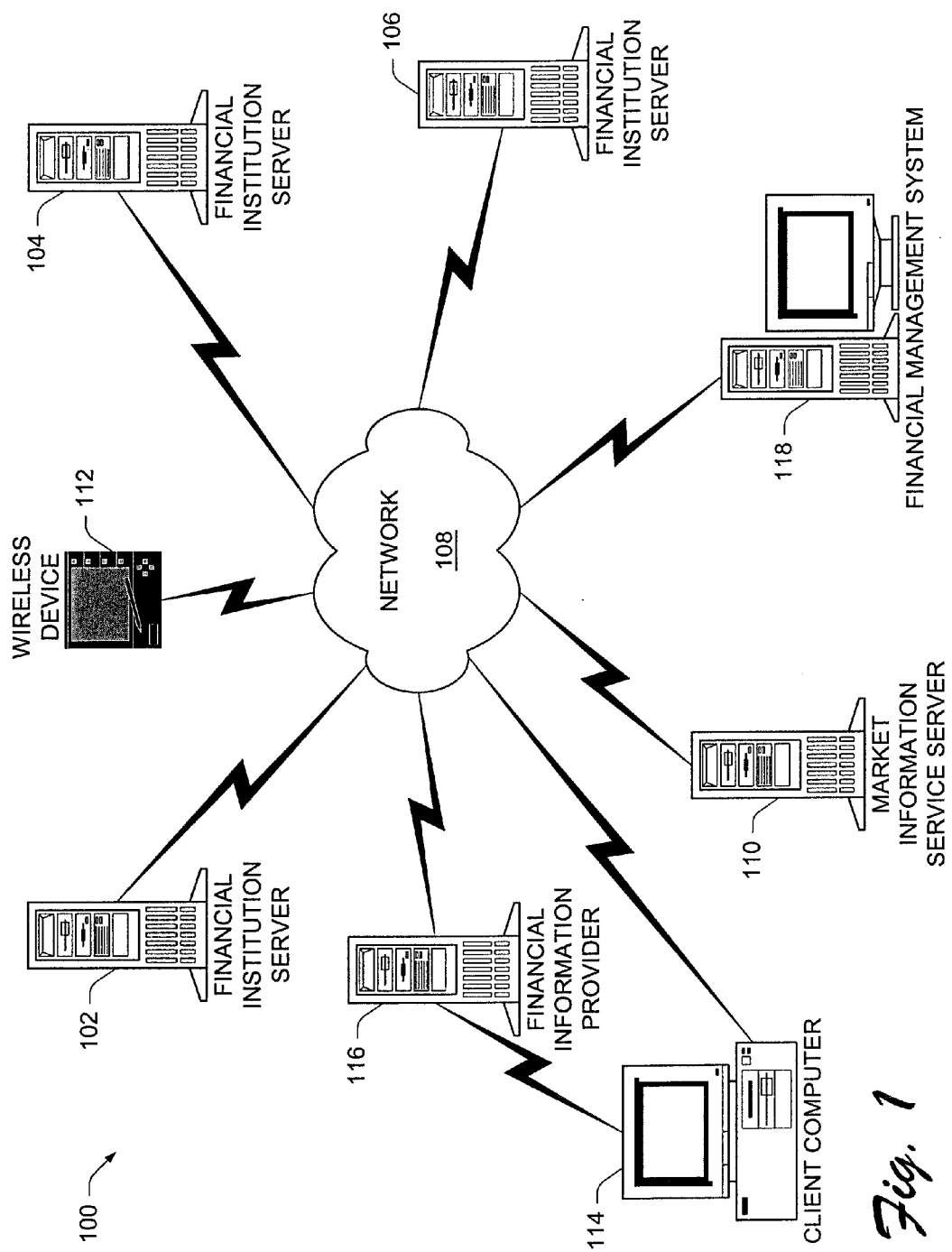
FIG. 1 illustrates an exemplary network environment in which various servers, computing devices, and financial management systems exchange data across a network, such as the Internet.

The system and methods described herein automatically authenticate and evaluate risk associated with a particular user, a particular account, and/or a particular transaction, such as a financial transaction. A particular user's identity can be authenticated using information provided by the user, such as driver's license number, social security number, and address. The user's ability to access a particular account can be authenticated by utilizing a login name and associated password associated with the particular account. A particular risk associated with the user may be determined as well as a risk associated with the particular accounts involved in a requested financial transaction.

As used herein, the terms "account holder", "customer", "user", and "client" are interchangeable. "Account holder" refers to any person having access to an account, such as a financial account at a financial institution. A particular account may have multiple account holders (e.g., a joint checking account having husband and wife as account holders or a corporate account identifying several corporate employees as account holders. Various financial account and financial institution examples are provided herein for purposes of explanation. However, it will be appreciated that the system and procedures described herein can be used with any type of asset account and any type of debt account. Example asset accounts include savings accounts, money market accounts, checking accounts (both interest-bearing and non-interest-bearing), certificates of deposit (CDs), mutual funds, bonds, and equities. Example debt accounts include credit card accounts, mortgage accounts, home equity loans, overdraft protection, margin accounts, personal loans, and other types of loans. Exemplary financial institutions include banks, savings and loans, credit unions, mortgage companies, mutual fund companies, lending companies, and stock brokers.

Further, particular examples discussed herein are related to financial transactions involving financial accounts at financial institutions. However, the methods and systems described herein may be applied to any type of transaction involving any type of account. For example, a data aggregation system may aggregate data from multiple sources, such as multiple financial accounts, multiple email accounts, multiple online award (or reward) accounts, and the like. Similarly, authentication and verification systems may authenticate and/or verify a user's right to access one or more accounts or execute a transaction involving one or more accounts. Thus, the methods and systems described herein may be applied to a data aggregation system or any other account management system instead of the financial management system discussed in the examples provided herein.

Various attributes associated with an asset account and/or a debt account are discussed herein. These attributes are used to analyze various accounts and make recommendations that would benefit the account holder. Example attributes include interest rate, loan repayment terms, minimum balance, type of collateral, etc. Although particular examples are discussed herein with reference to interest rates, it will be appreciated that the methods and systems described herein are applicable to any type of attribute.

FIG. 1 illustrates an exemplary network environment 100 in which various servers, computing devices, and financial management systems exchange data across a data communication network. The network environment of FIG. 1 includes multiple financial institution servers 102, 104, and 106 coupled to a data communication network 108, such as the Internet. A market information service server 110 and a financial management system 118 are also coupled to network 108. Additionally, a wireless device 112 and a client computer 114 are coupled to network 108. Wireless device 112 may be a personal digital assistant (PDA), a handheld or portable computer, a cellular phone, a pager, or any other device capable of communicating with other devices via a wireless connection. A financial information provider 116 is coupled between network 108 and client computer 114.

Network 108 may be any type of data communication network using any communication protocol. Further, network 108 may include one or more sub-networks (not shown) which are interconnected with one another.

The communication links shown between the network 108 and the various devices (102-106 and 110-118) shown in FIG. 1 can use any type of communication medium and any communication protocol. For example, one or more of the communication links shown in FIG. 1 may be a wireless link (e.g., a radio frequency (RF) link or a microwave link) or a wired link accessed via a public telephone system or another communication network. Wireless device 112 typically accesses network 108 via a wireless connection to another communication network that is coupled to network 108. Certain devices, such as servers, may be coupled to a local area network (LAN), which is coupled to network 108. Client computer 114 may access network 108 in different ways. First, client computer 114 may directly access network 108, for example, by using a modem to access a public telephone network (e.g., a public switched telephone network (PSTN)) that is coupled to network 108. Alternately, client computer 114 may access financial information provider 116, which establishes a connection to network 108. Financial information provider 116 may act as a "buffer" between network 108 and client computer 114, or may allow commands and data to simply pass-through between the network 108 and the client computer 114.

Each of the financial institution servers 102, 104, and 106 are typically associated with a particular financial institution and store data for that financial institution, such as customer account data. The market information service server 110 may represent one or more services that collect and report information regarding current financial market conditions. For example, a particular market information service may collect information from many financial institutions to generate a report identifying the average interest rates for savings, checking, or other accounts. The report may also identify the highest rates for each type of account and the financial institution offering those rates. Multiple market information service servers 110 may be coupled to network 108, each server providing a different type of market data.

Financial management system 118 performs various account analysis functions to determine whether a user's financial accounts (e.g., both asset accounts and debt accounts) are optimized. Additionally, financial management system 118 is capable of initiating the automatic transfer of funds between accounts at one or more financial institutions. These analysis and fund transfer functions are discussed in greater detail below. Wireless device 112 and client computer 114 allow a user to access information via the network 108. For example, the user can access account information from one of the financial institution servers 102, 104, or 106, access current interest rate data from market information service server 110, or send a request for an analysis of the user's financial accounts to financial management system 118. Financial information provider 116 acts as an intermediary between client computer 114 and other devices coupled to network 108. For example, client computer 114 generates a request for data or account analysis and communicates the request to the financial information provider 116. The financial information provider 116 then retrieves the requested data or initiates the requested account analysis on behalf of the user of client computer 114.

Figure 2:
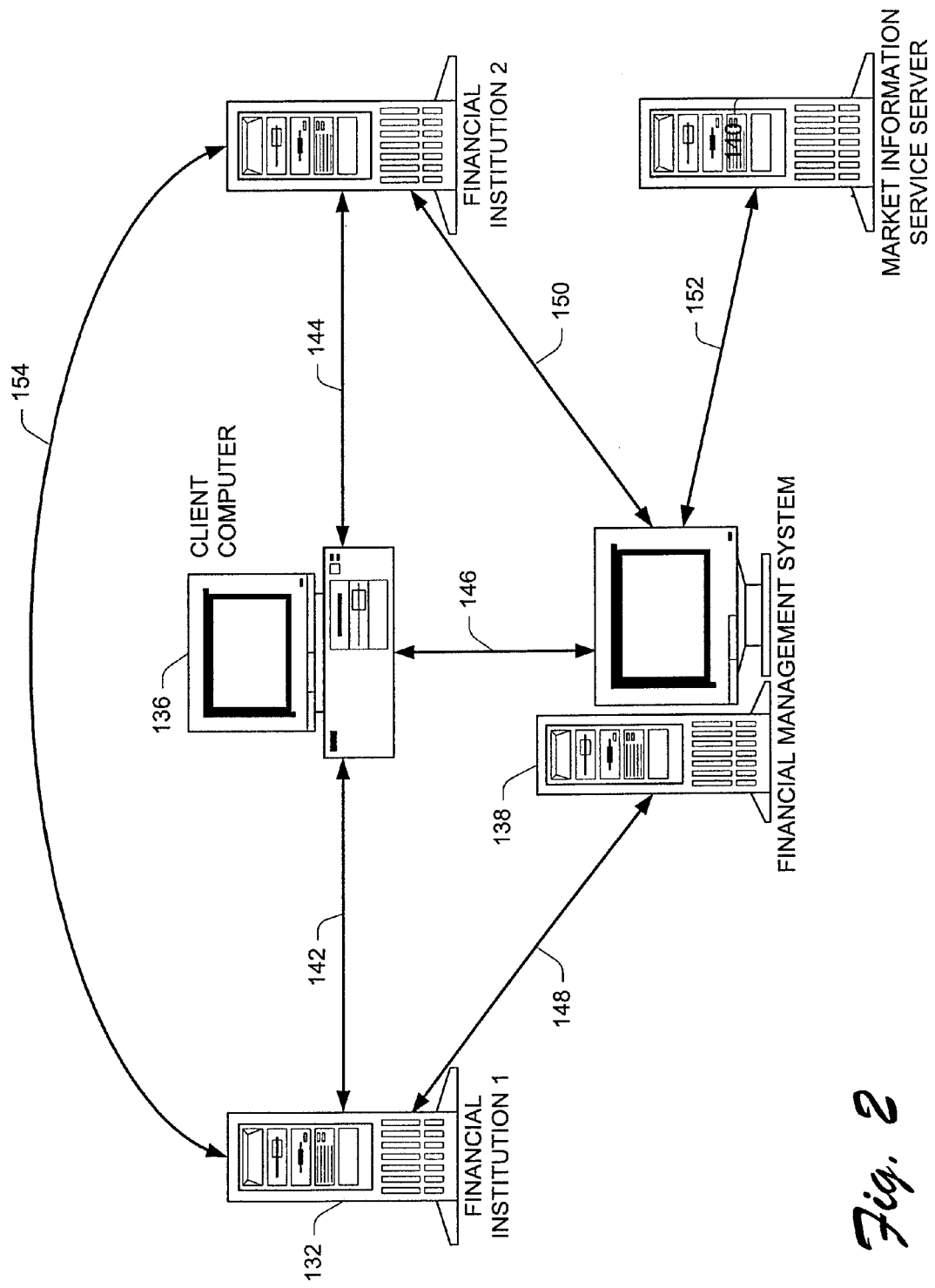
FIG. 2 illustrates an example of the interaction between a particular pair of financial institution servers, a market information service, a client computer, and a financial management system.

FIG. 2 illustrates an example of the interaction between a particular pair of financial institution servers 132 and 134, a market information service server 140, a client computer 136, and a financial management system 138. In this example, each financial institution server 132 and 134 is associated with a different financial institution. Client computer 136 is capable of accessing financial institution server 132 via a communication link 142 and accessing financial institution server 134 via a communication link 144. For example, the user of client computer 136 may retrieve account information or interest rate information from one or both of the financial institution servers 132, 134. Client computer 136 is also capable of interacting with financial management system 138 via a communication link 146. The user of client computer 136 may access financial management system 138, for example, to have the system analyze the user's financial accounts and automatically initiate the transfer of funds between accounts.

Financial management system 138 is coupled to the two financial institution servers 132 and 134 via two communication links 148 and 150, respectively. Communication links 148 and 150 allow the financial management system 138 to retrieve information from the financial institution servers 132, 134, and execute transactions on the financial institution servers on behalf of the user of client computer 136. Financial management system 138 is also coupled to market information service server 140 through a communication link 152, which allows the financial management system to retrieve various information regarding market interest rates and other market data. Financial institution servers 132 and 134 are capable of communicating with one another via a communication link 154, which allows the servers to exchange data and other information with one another.

Communication links 142-154 may be dial-up connections and/or connections via one or more networks of the type discussed above with respect to FIG. 1.

Figure 3:
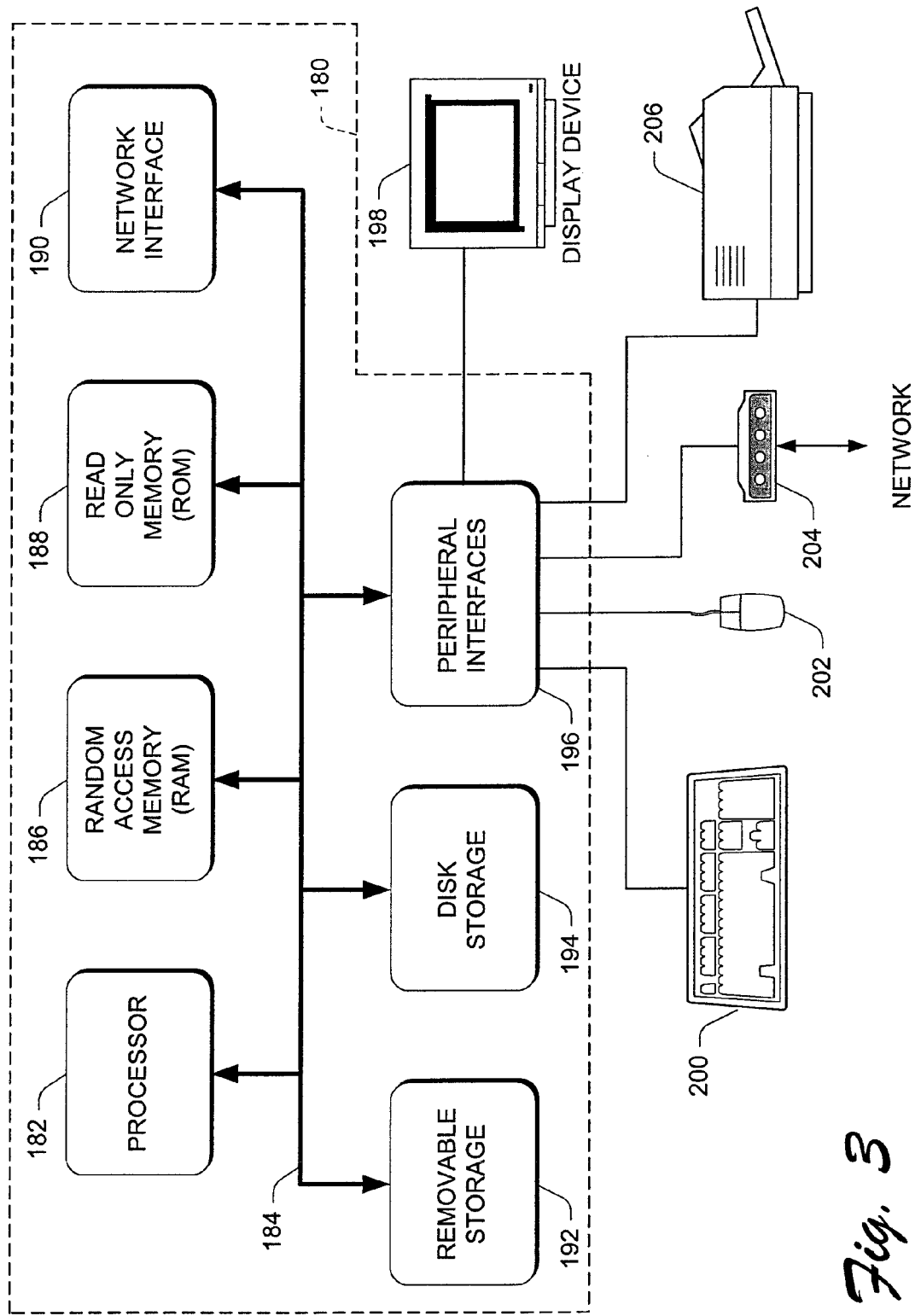
FIG. 3 is a block diagram showing pertinent components of a computer in accordance with the invention.

FIG. 3 is a block diagram showing pertinent components of a computer 180 in accordance with the invention. A computer such as that shown in FIG. 3 can be used, for example, to perform various financial analysis operations such as accessing and analyzing a user's financial account information to make account recommendations. Computer 180 can also be used to access a web site or other computing facility to access the various financial analysis functions. The computer shown in FIG. 3 can function as a server, a client computer, or a financial management system, of the types discussed herein.

Computer 180 includes at least one processor 182 coupled to a bus 184 that couples together various system components. Bus 184 represents one or more of any of several types of bus structures, such as a memory bus or memory controller, a peripheral bus, and a processor or local bus using any of a variety of bus architectures. A random access memory (RAM) 186 and a read only memory (ROM) 188 are coupled to bus 184. Additionally, a network interface 190 and a removable storage device 192, such as a floppy disk or a CD-ROM, are coupled to bus 184. Network interface 190 provides an interface to a data communication network such as a local area network (LAN) or a wide area network (WAN) for exchanging data with other computers and devices. A disk storage 194, such as a hard disk, is coupled to bus 184 and provides for the non-volatile storage of data (e.g., computer-readable instructions, data structures, program modules and other data used by computer 180). Although computer 180 illustrates a removable storage 192 and a disk storage 194, it will be appreciated that other types of computer-readable media which can store data that is accessible by a computer, such as magnetic cassettes, flash memory cards, digital video disks, and the like, may also be used in the exemplary computer.

Various peripheral interfaces 196 are coupled to bus 184 and provide an interface between the computer 180 and the individual peripheral devices. Exemplary peripheral devices include a display device 198, a keyboard 200, a mouse 202, a modem 204, and a printer 206. Modem 204 can be used to access other computer systems and devices directly or by connecting to a data communication network such as the Internet.

A variety of program modules can be stored on the disk storage 194, removable storage 192, RAM 186, or ROM 188, including an operating system, one or more application programs, and other program modules and program data. A user can enter commands and other information into computer 180 using the keyboard 200, mouse 202, or other input devices (not shown). Other input devices may include a microphone, joystick, game pad, scanner, satellite dish, or the like.

Computer 180 may operate in a network environment using logical connections to other remote computers. The remote computers may be personal computers, servers, routers, or peer devices. In a networked environment, some or all of the program modules executed by computer 180 may be retrieved from another computing device coupled to the network.

Typically, the computer 180 is programmed using instructions stored at different times in the various computer-readable media of the computer. Programs and operating systems are often distributed, for example, on floppy disks or CD-ROMs. The programs are installed from the distribution media into a storage device within the computer 180. When a program is executed, the program is at least partially loaded into the computer's primary electronic memory. As described herein, the invention includes these and other types of computer-readable media when the media contains instructions or programs for implementing the steps described below in conjunction with a processor. The invention also includes the computer itself when programmed according to the procedures and techniques described herein.

For purposes of illustration, programs and other executable program components are illustrated herein as discrete blocks, although it is understood that such programs and components reside at various times in different storage components of the computer, and are executed by the computer's processor. Alternatively, the systems and procedures described herein can be implemented in hardware or a combination of hardware, software, and/or firmware. For example, one or more application specific integrated circuits (ASICs) can be programmed to carry out the systems and procedures described herein.

Figure 4:
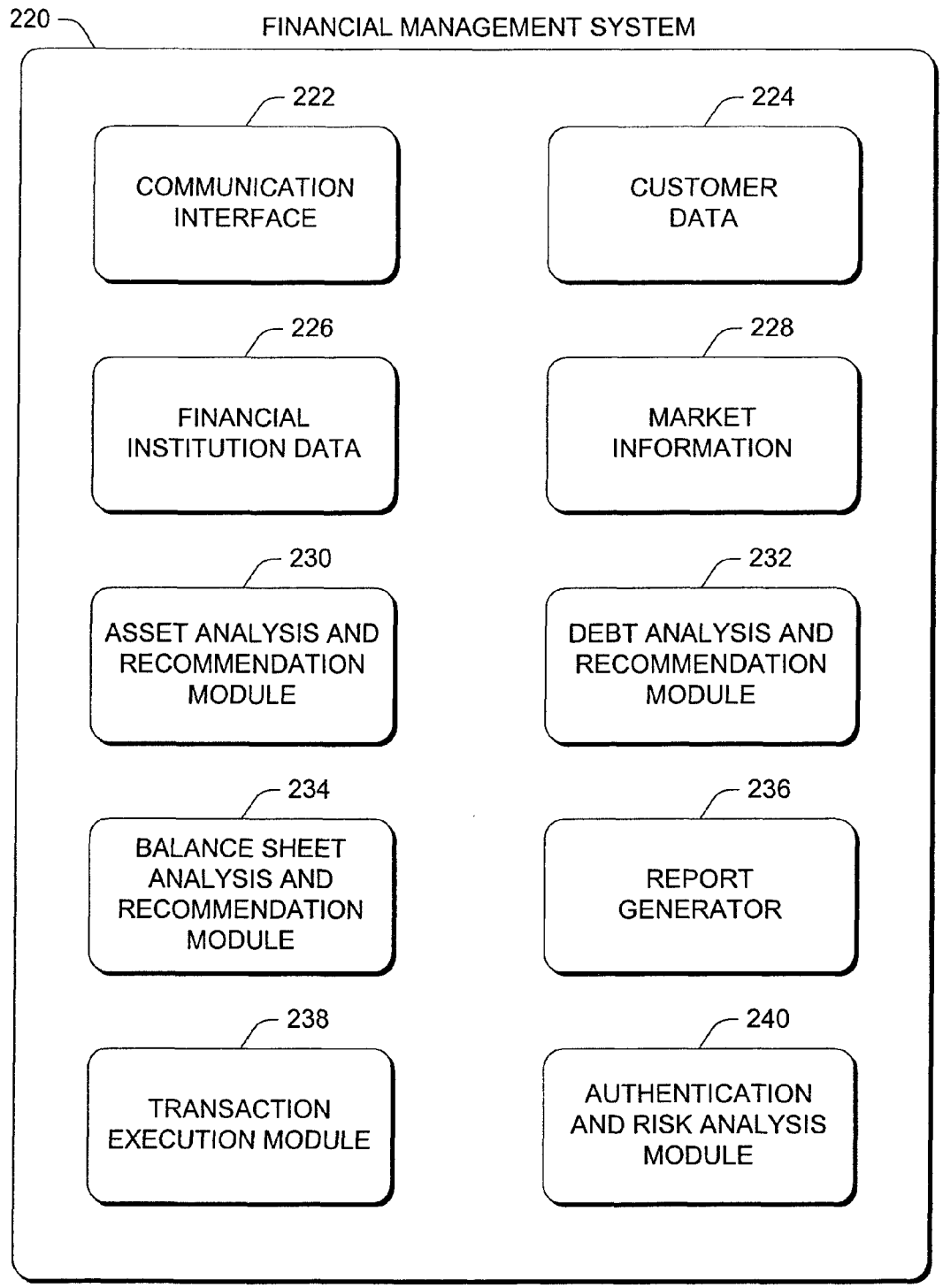
FIG. 4 is a block diagram showing exemplary components and modules of a financial management system.

FIG. 4 is a block diagram showing exemplary components and modules of a financial management system 220. A communication interface 222 allows the financial management system 220 to communicate with other computing systems, such as servers, client computers, and portable computing devices. In one embodiment, communication interface 222 is a network interface to a LAN, which is coupled to another data communication network, such as the Internet.

The financial management system 220 stores customer data 224, such as customer account information, online banking login name and password, and user preferences. Financial management system 220 also stores financial institution data 226 and market information 228. Financial institution data 226 includes, for example, transaction routing data, account offerings, account interest rates, and minimum account balances. Market information 228 includes data such as average interest rates for different types of accounts (both asset accounts and debt accounts), the best available interest rates for each type of account, and the financial institutions offering the best available interest rates.

An asset analysis and recommendation module 230 analyzes various asset accounts to determine whether the accounts are earning the best available interest rates (or close to the best interest rates) and whether the fund allocation among the asset accounts is optimal or close to optimal. If fund adjustments would benefit the account holder, then module 230 makes the appropriate recommendations to the account holder. The asset accounts analyzed may be associated with two or more different financial institutions. A debt analysis and recommendation module 232 analyzes various debt accounts to determine whether the accounts are paying the most competitive (i.e., the lowest) interest rates or close to the best interest rates. Module 232 also determines whether the allocation of funds among the debt accounts is optimal or close to optimal, and makes recommendations, if necessary, to adjust funds in a manner that reduces the overall interest payments. The debt accounts analyzed may be associated with two or more different financial institutions.

A balance sheet analysis and recommendation module 234 analyzes both asset accounts and debt accounts to determine whether the allocation of funds among all of the accounts is optimal or close to optimal. If fund adjustments would benefit the account holder, then the balance sheet analysis and recommendation module 234 makes the appropriate recommendations to the account holder.

A report generator 236 generates various types of reports, such as account activity history, current recommendations to adjust funds among accounts, or a report comparing the current market interest rates to the interest rates of a user's current accounts. A transaction execution module 238 executes financial transactions on behalf of account holders. For example, an account holder may request that the financial management system 220 execute the recommendations generated by one or more of the three analysis and recommendation modules 230, 232, and 234. In this example, transaction execution module 238 identifies the recommendations and executes the financial transactions necessary to implement the recommendations. An authentication and risk analysis module 240 verifies that the user accessing financial management system 220 is authorized to access a particular account and analyzes the risks associated with allowing a particular user to access the financial management system or execute a particular transaction using the financial management system.

Figure 5:
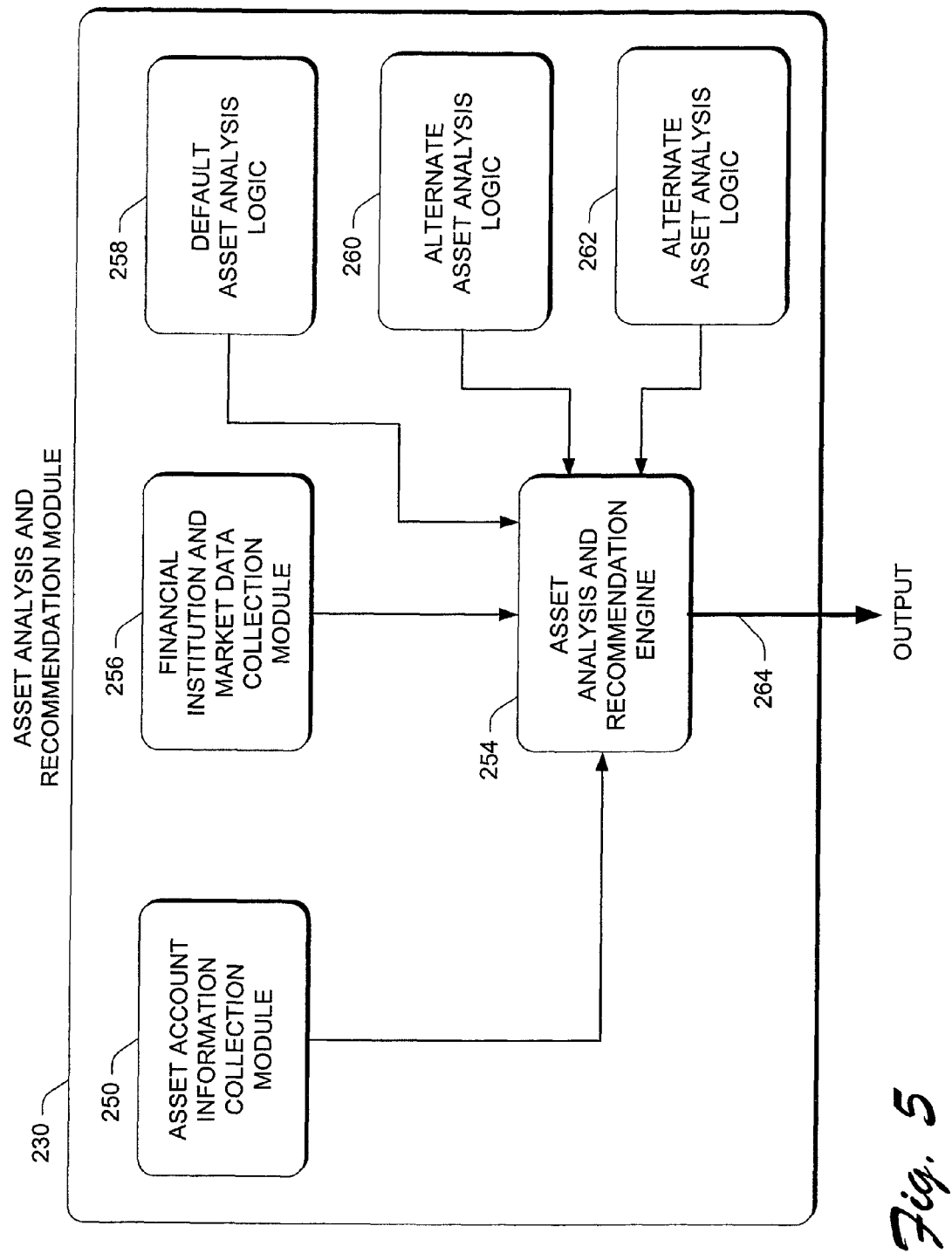
FIG. 5 is a block diagram showing exemplary components and modules of an asset analysis and recommendation module.

FIG. 5 is a block diagram showing exemplary components and modules of asset analysis and recommendation module 230. An asset account information collection module 250 collects information about a user's asset accounts. When a user accesses the financial management system and requests an analysis of the user's asset accounts, the system prompts the user to enter account information for all of the user's asset accounts. The information provided for each account may include the name of the financial institution, the account number, and the login name and password for online access to the account. This information is typically stored by the financial management system to avoid asking the user to re-enter the same information in the future. Based on the information provided by the user, the asset account information collection module 250 is able to access the user's accounts and determine the balance of each account as well as other information such as the interest rate and minimum balance for the account.

After collecting the user's asset account information, the collection module 250 organizes the account information into a common format and communicates the information to an asset analysis and recommendation engine 254 for processing.

A financial institution and market data collection module 256 collects information about particular financial institutions (e.g., transaction routing information and account offerings) and information about current market interest rates. The information about financial institutions may be retrieved from the financial institutions themselves or from one or more market information services that provide information about various financial institutions. The information relating to current market interest rates is collected from one or more market information services. After collecting the financial institution information and the market data, the collection module 256 communicates the collected information and data to the asset analysis and recommendation engine 254.

A default asset analysis logic 258 defines a default set of logic rules used to analyze a user's asset accounts. These default logic rules are used if the user does not create their own set of logic rules and does not select from one of several sets of alternate asset analysis logic rules 260 and 262. The alternate logic rules 260 and 262 may provide different approaches to asset account analysis (e.g., a conservative approach, a moderate approach, or an aggressive approach). In particular embodiments, at least one of the alternate logic rules 260, 262 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user regularly makes a $1000 payment from a particular checking account on the 15th of each month, a rule may be created by the financial management system to ensure that the checking account has at least a $1000 balance on the 14th of each month. If the checking account does not have a sufficient balance, then the financial management system may recommend a fund transfer to raise the balance of the checking account to cover the anticipated $1000 payment on the 15th. This type of user-specific logic rule may be stored with the other user data in the financial management system.

Asset analysis and recommendation engine 254 analyzes the user's asset account information by applying the various asset analysis logic rules to the asset account information. The asset analysis and recommendation engine 254 also considers market data collected by collection module 256 when analyzing the user's asset accounts. After analyzing the user's asset accounts, the asset analysis and recommendation engine 254 generates one or more recommendations to adjust the fund allocation among the asset accounts. The recommendation may also include opening a new asset account (e.g., an account that pays a higher interest rate) and/or closing an existing asset account (e.g., an account that pays a low interest rate). The recommendations and analysis results are output on communication link 264 for use by other modules or components in the financial management system.

Figure 6:
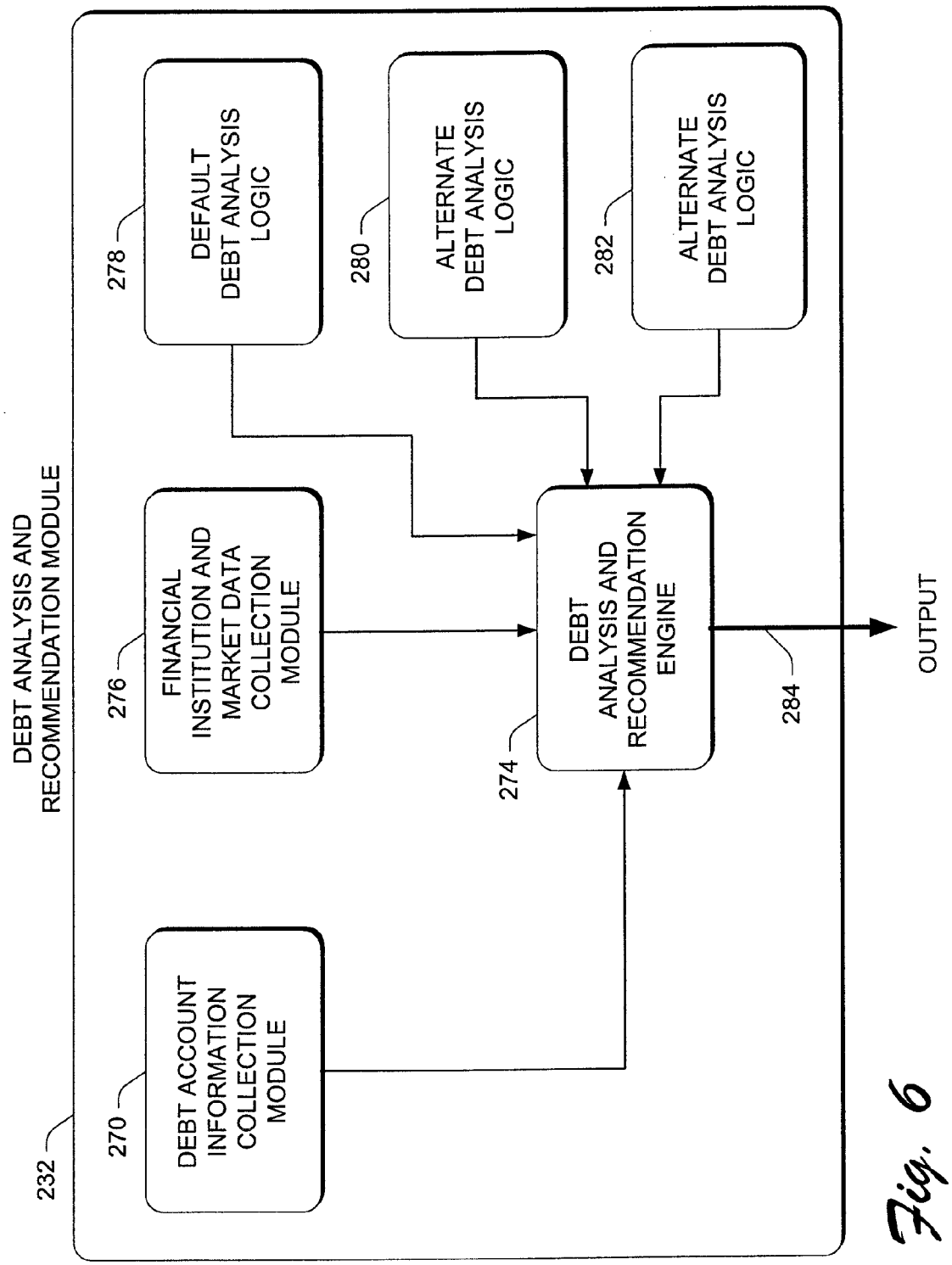
FIG. 6 is a block diagram showing exemplary components and modules of a debt analysis and recommendation module.

FIG. 6 is a block diagram showing exemplary components and modules of debt analysis and recommendation module 232. A debt account information collection module 270 collects information about a user's debt accounts. When a user accesses the financial management system and requests an analysis of the user's debt accounts, the system prompts the user to enter account information for each of the user's debt accounts. The information provided for each account may include the name of the financial institution, the account number, and information necessary to access the account online. This information is typically stored by the financial management system to avoid asking the user to re-enter the same information in the future. Based on the information provided by the user, the debt account collection module 270 accesses the user's debt accounts and determines the balance of each account as well as other information, such as the interest charged and the maximum balance for the account.

After collecting the user's debt account information, the collection module 270 organizes the account information into a common format and communicates the account information to a debt analysis and recommendation engine 274 for processing.

A financial institution and market data collection 276 collects information regarding particular financial institutions and information about current market interest rates. The information relating to financial institutions may be retrieved from the financial institutions themselves or from one or more market information services that provide information about various financial institutions. The information relating to current market interest rates is collected from one or more market information services. After collecting the financial institution information and the market data, the collection module 276 communicates the collected information and data to the debt analysis and recommendation engine 274.

A default debt analysis logic 278 defines a default set of logic rules used to analyze a user's debt accounts. These default logic rules are used if the user does not create their own set of logic rules and does not select from one of the several sets of alternate debt analysis logic 280 and 282. The alternate logic rules 280 and 282 may provide different approaches to debt account analysis, such as a conservative approach, a moderate approach, or an aggressive approach. In a particular embodiment, at least one of the alternate logic rules 280, 282 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has too many expenses (i.e., the current month's expenses exceed the user's typical monthly income), then the logic rules (applied by the analysis engine) may suggest a short term loan to cover the expenses, thereby avoiding a situation in which the user has insufficient funds to pay bills as they become due. Additionally, if the loan will only be required for a short period of time, the rules may suggest opening (or taking advantage of an existing) overdraft protection account.

Different debt logic rules may be applied depending on a user's opinions regarding debt. One user might use the majority of available assets to pay down debts, thereby minimizing the user's level of debt. Another user might want to maintain a larger "cushion" of cash and only pay down debts if the available assets exceed a predetermined amount (e.g., $10,000). Debt rules from, for example, a celebrity or well-known financial analyst might recommend setting aside savings at the beginning of the month to "force" the appropriate monthly savings. The remainder of the assets are then used to pay monthly bills and other expenses. Other financial analysts may use different sets of logic rules to define the analysis and handling of asset accounts and debt accounts.

Debt analysis and recommendation engine 274 analyzes the user's debt account information by applying the various debt analysis logic rules to the debt account information. The debt analysis and recommendation engine 274 also considers market data collected by collection module 276 when analyzing the user's debt accounts. After analyzing the user's debt accounts, the debt analysis and recommendation engine 274 generates one or more recommendations to adjust the fund allocation among the debt accounts. The recommendation may also include opening a new debt account (e.g., an account with a lower interest rate) and/or closing an existing debt account (e.g., an account with a high interest rate). The recommendations and analysis results are output on communication link 284 for use by other modules or components in the financial management system.

Figure 7:
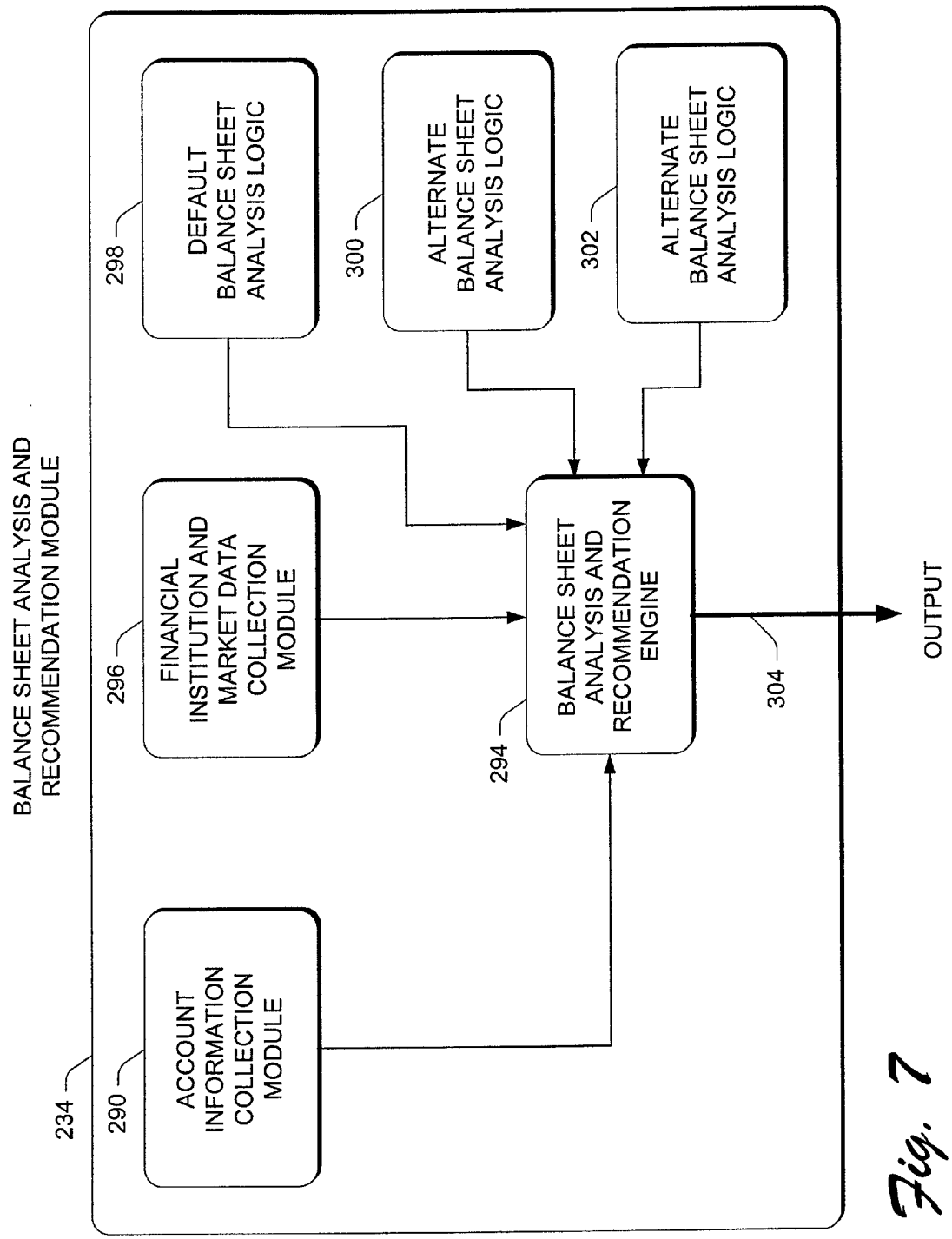
FIG. 7 is a block diagram showing exemplary components and modules of a balance sheet analysis and recommendation module.

FIG. 7 is a block diagram showing exemplary components and modules of balance sheet analysis and recommendation module 234. An account information collection module 290 collects information about a user's asset accounts and debt accounts. When a user accesses the financial management system and requests an analysis of the user's balance sheet, the system prompts the user to enter account information for each of the user's asset accounts and debt accounts. The information provided for each account may include the name of the financial institution, the account number, and information necessary to access the account online. This information is typically stored by the financial management system to avoid asking the user to re-enter the same information in the future. Based on the information provided by the user, the account collection module 290 accesses the user's debt accounts and determines the balance of each account as well as other information, such as the interest charged or earned, and the maximum balance or credit limit associated with the account.

After collecting the user's asset and debt account information, the collection module 290 organizes the account information into a common format and communicates the account information to a balance sheet analysis and recommendation engine 294 for processing.

A financial institution and market data collection 296 collects information regarding particular financial institutions and information about current market interest rates for both asset accounts and debt accounts. The information relating to financial institutions may be retrieved from the financial institutions themselves or from one or more market information services that provide information about various financial institutions. The information relating to current market interest rates is collected from one or more market information services. After collecting the financial institution information and the market data, the collection module 296 communicates the collected information and data to the balance sheet analysis and recommendation engine 294.

A default balance sheet analysis logic 298 defines a default set of logic rules used to analyze a user's balance sheet. These default logic rules are used if the user does not create their own set of logic rules and does not select from one of the several sets of alternate balance sheet analysis logic 300 and 302. The alternate logic rules 300 and 302 may provide different approaches to debt account analysis, such as a conservative approach, a moderate approach, or an aggressive approach. In a particular embodiment, at least one of the alternate logic rules 300, 302 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has funds earning a low interest rate in a savings account and carries a balance on a credit card with a high interest rate, the logic rules may suggest applying some or all of the funds in the savings account to pay off all or a portion of the balance on the credit card.

Different balance sheet logic rules may be applied depending on a user's opinions regarding assets and debts. One user might prefer to use the majority of available assets to pay down debts, thereby minimizing the user's level of debt. Another user might want to maintain a larger "cushion" of cash and only pay down debts if the available assets exceed a predetermined amount (e.g., $5,000).

Balance sheet analysis and recommendation engine 294 analyzes the user's balance sheet information by applying the various balance sheet analysis logic rules to the balance sheet information. The balance sheet analysis and recommendation engine 294 also considers financial institution and market data collected by collection module 296 when analyzing the user's balance sheet. After analyzing the user's balance sheet, the balance sheet analysis and recommendation engine 294 generates one or more recommendations to adjust the fund allocation among the user's asset accounts and debt accounts. The recommendation may also include opening one or more new accounts and/or closing one or more existing accounts. The recommendations and analysis results are output on communication link 304 for use by other modules or components in the financial management system.

Figure 8:
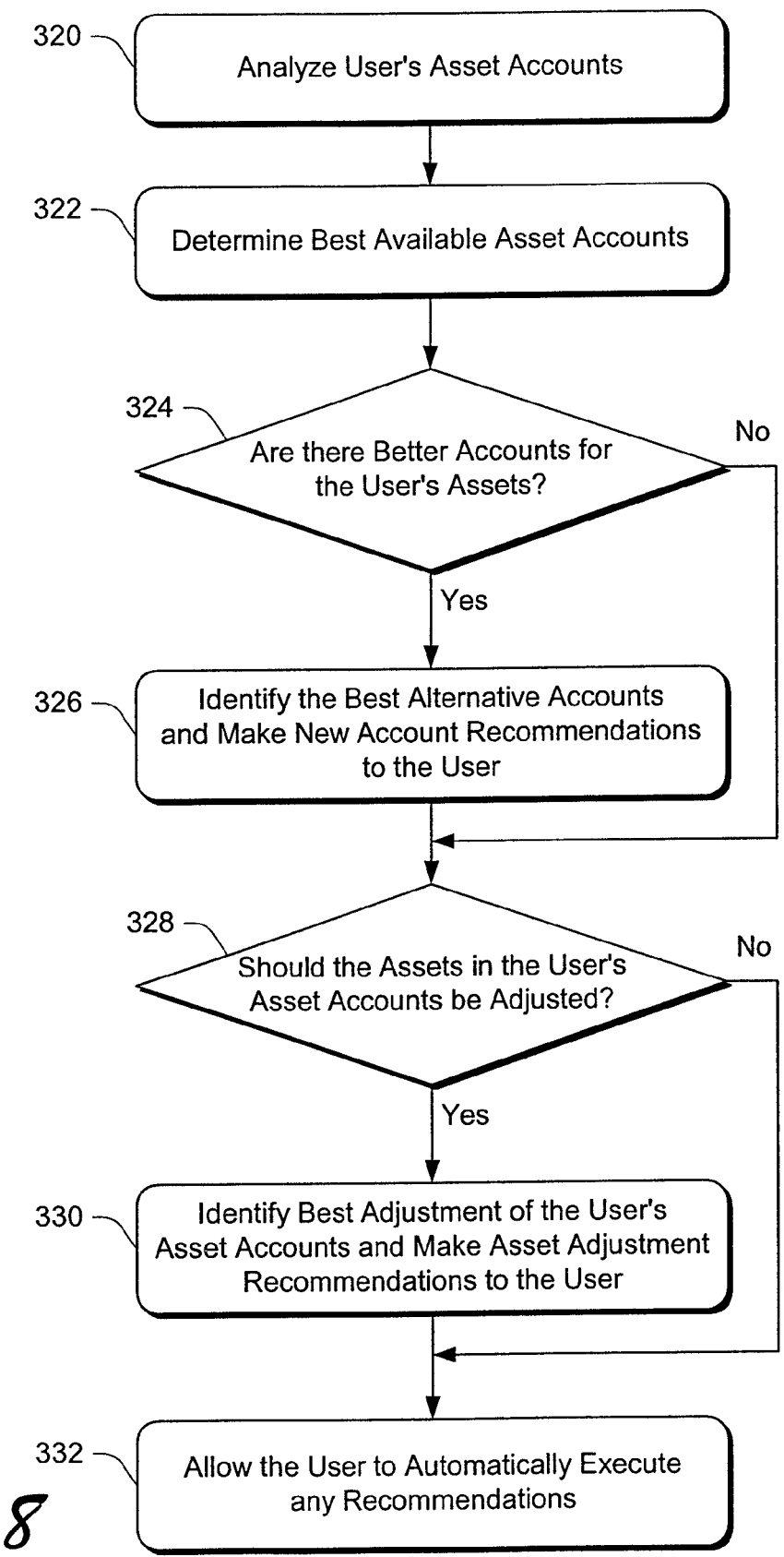
FIG. 8 is a flow diagram illustrating a procedure for identifying financial transactions to optimize a user's asset account balances.

FIG. 8 is a flow diagram illustrating a procedure for identifying financial transactions to optimize a user's asset account balances. The procedure begins by analyzing the user's asset accounts (block 320). The procedure then determines the best available asset accounts (block 322), for example, by using market interest rate information from a market information service. Next, the procedure determines whether there are better accounts for the user's assets (block 324). These "better" accounts may include asset accounts that earn higher interest rates than the user's current asset accounts.

If the procedure identifies better accounts for the user's assets, then the procedure selects the best alternative account (or accounts) and makes a recommendation that the user open the alternative account (block 326). If the procedure does not identify any better accounts for the user's assets, then the procedure continues to block 328, where the procedure determines whether the assets in the user's accounts should be adjusted. If the user's asset accounts should be adjusted, then the procedure identifies the best adjustment of the user's asset accounts and makes asset adjustment recommendations to the user (block 330). Finally, the user is provided the opportunity to automatically execute any of the recommendations, such as opening one or more new asset accounts and/or moving funds between asset accounts (block 332). If the user chooses to have the recommendations executed automatically, the financial management system executes the necessary financial transactions to implement the system's recommendations as discussed in greater detail below. The procedure described above with respect to FIG. 8 may be implemented, for example, by asset analysis and recommendation module 230.

Figure 9:
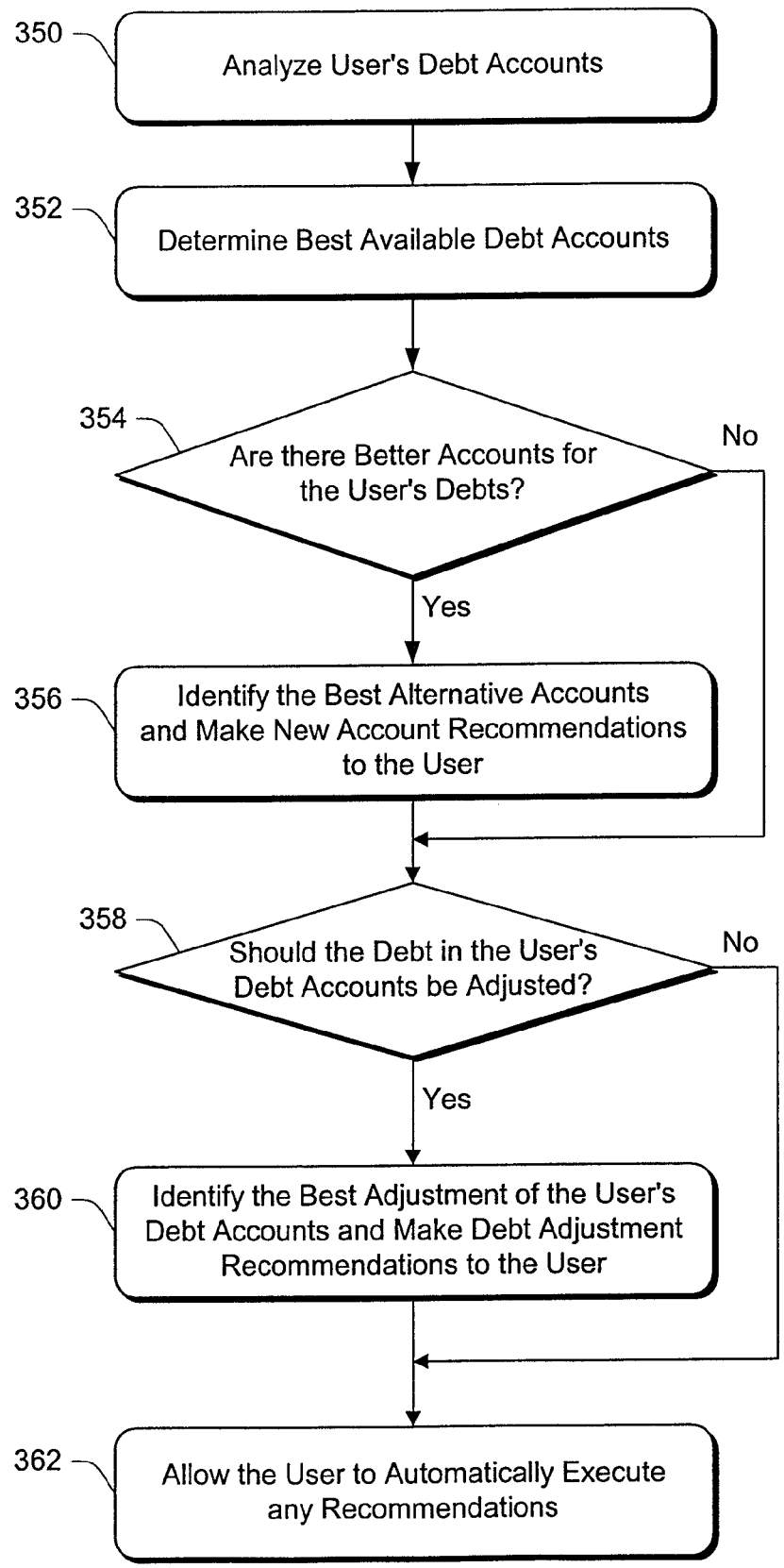
FIG. 9 is a flow diagram illustrating a procedure for identifying financial transactions to optimize a user's debt account balances.

FIG. 9 is a flow diagram illustrating a procedure for identifying financial transactions to optimize a user's debt account balances. The procedure analyzes the user's debt accounts (block 350) and determines the best available debt accounts (block 352). The best available debt accounts are determined, for example, by using market interest rate information from one or more market information services. Next, the procedure determines whether there are better accounts for the user's debts (block 354). These "better" accounts may include debt accounts that charge lower interest rates than the user's current debt accounts.

If better accounts are identified for the user's debts, then the procedure selects the best alternative account (or accounts) and makes a recommendation that the user open the alternative account (block 356). If the procedure does not identify any better accounts for the user's debts, then the procedure continues to block 358, to determine whether the debts in the user's accounts should be adjusted. If the user's debt accounts should be adjusted, then the procedure identifies the best adjustment of the user's debt accounts and makes asset adjustment recommendations to the user (block 360). Finally, the user is provided the opportunity to automatically execute any of the recommendations, such as opening one or more new debt accounts and/or moving funds between debt accounts (block 362). If the user chooses to have the recommendations executed automatically, the financial management system executes the necessary financial transactions to implement the system's recommendations, as discussed below. The procedure described above with respect to FIG. 9 can be implemented, for example, by debt analysis and recommendation module 232.

Figure 10:
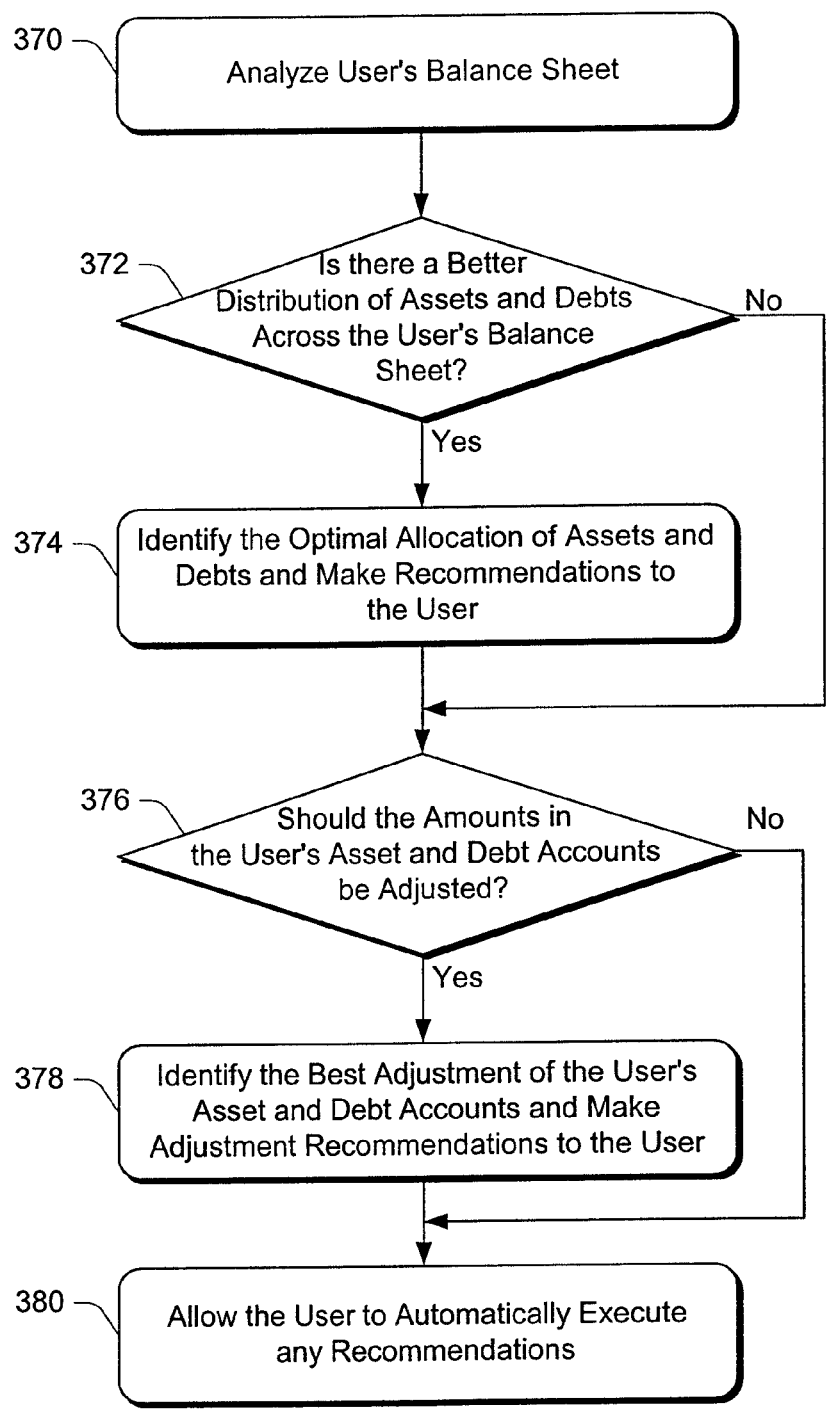
FIG. 10 is a flow diagram illustrating a procedure for identifying financial transactions to optimize a user's balance sheet.

FIG. 10 is a flow diagram illustrating a procedure for identifying financial transactions to optimize a user's balance sheet. The procedure analyzes the user's balance sheet (block 370) and determines whether there is a better distribution of assets and debts across the user's balance sheet (block 372). For example, a "better distribution" of assets and debts may result in greater interest earned by the user or less interest paid by the user. If there is a better distribution of assets and debts across the user's balance sheet, then the procedure identifies the optimal allocation of assets and debts and makes recommendations to the user (block 374).

If the procedure does not identify any better distribution of assets and debts, then the procedure continues to block 376, to determine whether the amounts in the user's asset and debt accounts should be adjusted. If the user's accounts should be adjusted, then the procedure identifies the best adjustment of the user's asset and debt accounts and makes adjustment recommendations to the user (block 378). Finally, the user is provided the opportunity to automatically execute any of the recommendations (block 380), such as moving funds between accounts to maximize interest earned or minimize interest paid. If the user chooses to have the recommendations executed automatically, the financial management system executes the necessary financial transactions to implement the system's recommendations. The procedure described above with respect to FIG. 10 can be implemented, for example, by balance sheet analysis and recommendation module 234.

A user may choose to have the financial management system 220 (FIG. 4) analyze and make recommendations regarding the user's asset accounts, while ignoring the user's debt accounts. FIG. 8 illustrates an example procedure for this type of analysis and recommendation. Additionally, the user may select specific asset accounts to ignore during the analysis procedure. For example, the user may have a savings account for a special purpose. Even though the savings account may earn a below-average interest rate, the user does not want funds transferred into or out of that savings account. In this example, the user would instruct the financial management system to ignore that particular savings account.

The user may also choose to have the financial management system analyze and make recommendations regarding the user's debt accounts, while ignoring the user's asset accounts. FIG. 9 illustrates an example procedure for this type of analysis and recommendation. Additionally, the user may select specific debt accounts to ignore during the analysis procedure. For example, the user may want to pay-off and close a particular debt account even though the account has a favorable interest rate. In this example, the user would instruct the financial management system to ignore that particular debt account when performing its analysis.

The user can also choose to have the financial management system analyze and make recommendations regarding both the user's asset accounts and debt accounts (i.e., analyze the user's balance sheet). FIG. 10 illustrates an example procedure for this type of analysis and recommendation. Additionally, the user may select one or more asset accounts or debt accounts to ignore during the analysis procedure. Thus, the user has the option of selecting the types of accounts to consider, as well as specific accounts to consider or ignore, when the financial management system performs its analysis and makes recommendations.

Figure 11:
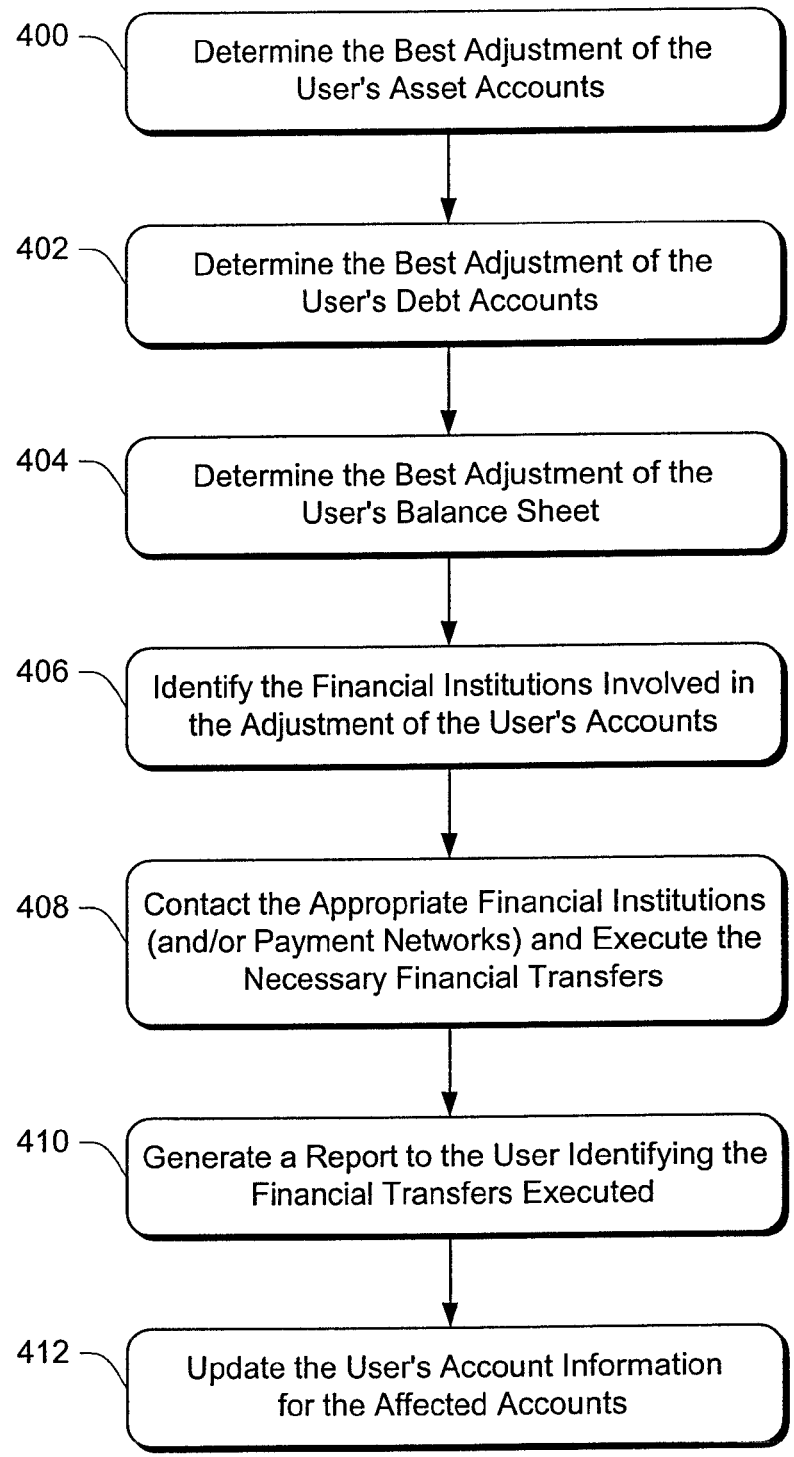
FIG. 11 is a flow diagram illustrating a procedure for automatically optimizing a user's asset accounts, debt accounts, and balance sheet.

FIG. 11 is a flow diagram illustrating a procedure for automatically optimizing a user's asset accounts, debt accounts, and balance sheet. Initially, the procedure determines the best adjustment of the user's asset accounts (block 400). The best adjustment of the user's asset accounts may include opening a new account, closing an existing account, and/or transferring funds between accounts (new accounts or existing accounts). If the user's asset accounts are already optimized, or almost optimized, the procedure determines that no adjustment of asset accounts is necessary.

Next, the procedure determines the best adjustment of the user's debt accounts (block 402) and the best adjustment of the user's balance sheet (block 404). The best adjustment of the user's debt accounts and the user's balance sheet may include opening one or more new accounts, closing one or more existing accounts, and/or transferring funds between accounts (new accounts or existing accounts). If the user's debt accounts are already optimized, or almost optimized, the procedure determines that no adjustment of debt accounts is necessary. Similarly, if the user's balance sheet is already optimized, or almost optimized, then the procedure determines that no adjustment of asset accounts or debt accounts is necessary.

The various logic rules discussed above, which are used by the financial management system to determine whether funds should be adjusted between accounts, may define how to determine whether accounts are "almost optimized." Typical factors that may be considered in determining whether accounts are "almost optimized" include: the savings (extra interest earned or less interest paid) that would result from an adjustment of funds, the difference in interest rates, the time required to implement the adjustment of funds, fees associated with the adjustment of funds, and the "risk" associated with the adjustment. The "risk" may be overdrawing an account by leaving insufficient funds to cover unexpected expenses (or expenses that are greater than expected).

For example, if a particular adjustment of funds would result in an increase in interest earnings of three cents per week, most logic rules will consider this situation "almost optimized." In this situation, the financial management system will not recommend the adjustment of funds because the additional interest is insignificant.

After the procedure has determined the best adjustment of the user's accounts (blocks 400, 402, and 404), the procedure identifies the financial institutions involved in the adjustment of the user's accounts (block 406). The financial institutions are determined from the information entered by the user when identifying the user's accounts to the financial management system. Next, the procedure contacts the appropriate financial institutions and/or payment networks and executes the financial transfers necessary to implement the recommended adjustments to the user's accounts (block 408). A payment network may be, for example, the Federal Automated Clearing House (ACH), a debit network, a credit network, the federal wire system, or an ATM network. The financial management system is able to automatically access the user's accounts by using the login name and password for the account, which is provided by the user when identifying the user's accounts to the financial management system.

After executing the financial transactions necessary to implement the recommended adjustments to the user's accounts, the a report is generated for the user that identifies the financial transfers executed (block 410). Finally, the user's account information is updated in the financial management system such that the system has accurate account balance information for all of the user's accounts (block 412).

The procedure described above with respect to FIG. 11 can be modified based on the user's preferences with respect to the types of accounts to be analyzed. For example, if the user selects only asset accounts for analysis, then the functions associated with blocks 402 and 404 of the procedure are not performed.

FIG. 12 shows a table 430 illustrating various information associated with different financial institutions. The information contained in table 430 may be obtained from the financial institution itself or from one or more market information services. The information contained in table 430 is periodically updated by comparing the information stored in the table against the current financial institution information.

The first column of table 430 identifies the name of the financial institution and the second column identifies the American Banking Association (ABA) number and routing number. The third column indicates an Internet uniform resource locator (URL) associated with the financial institution. The fourth column of table 430 identifies the various account offerings from a particular financial institution. In this example, Bank of America offers a savings account, two types of checking accounts (interest bearing and non-interest bearing), a three month certificate of deposit (CD), a home equity loan, a credit card account, and overdraft protection for a checking account. The next column indicates the type of account (e.g., an asset account or a debt account).

The sixth column of table 430 indicates the current interest rate associated with each account. In the case of an asset account, the interest rate is the interest paid to a customer based on the balance in the account. In the case of a debt account, the interest rate is the interest charged to a customer based on the outstanding balance of the debt. The last column in table 430 indicates the minimum balance associated with each account. In this example, the debt accounts do not have a minimum balance. However, a debt account may have a maximum balance (e.g., the maximum value that can be loaned). Although not shown in FIG. 12, additional account information may be stored in table 430, such as monthly service charges, per-check charges, service charges for ATM transactions, or service charges if the minimum balance is not maintained.

FIG. 13 shows a table 440 illustrating various customer information related to financial accounts and user preferences. Most information contained in table 440 is obtained from the user during an account setup procedure. The current account balance information is typically retrieved from the financial institution by the financial management system. The account balance information is periodically updated by retrieving current information from the financial institution.

The first column of table 440 identifies the customer name (the table contains customer information for multiple customers accessing the same financial management system). The second column identifies a financial institution and the third column identifies an account number as well as an online username and password associated with the account number. The username and password are used to access the account to perform online banking functions such as executing fund transfers or retrieving current account balances. The fourth column of table 440 identifies the accounts that the customer has with the financial institution (i.e., active accounts). For example, John Smith has five active accounts with Bank of America (savings, interest checking, home equity, credit card, and overdraft protection), one active account with Charles Schwab (money market account), and one active account with Rainbow Credit Union (savings account). The next column in table 440 indicates the current account balance for each active account. The last column indicates user preferences. The user preferences are determined by the user based on the manner in which the user wants information displayed, the manner in which accounts should be analyzed, and the types of recommendations the user desires. Additionally, the user preferences may specify certain minimum balances or other requirements for all accounts or for specific accounts. For example, the user preferences for John Smith specify that a minimum balance of $1500 should be maintained in the interest checking account. These user preferences are typically incorporated into the logic rules, discussed above, which are used to determine when and how to adjust funds between accounts.

Other types of user preferences include a maximum number of transactions per month in a particular account (e.g., some money market accounts set limits on the number of transactions in a particular month). By setting a user preference (or a logic rule) to limit the number of monthly transactions, the financial management system will not recommend (or attempt to execute) too many transactions in a particular month. A user may also set a preference that requires the financial management system to predict expenses for the next seven days (e.g., based on historical expenses during similar periods) and maintain a "buffer" in the account equal to the predicted expenses for the next seven days. Further, a user may set a preference indicating that funds should not be adjusted unless the adjustment results in a savings of at least five dollars per day.

Figure 14:
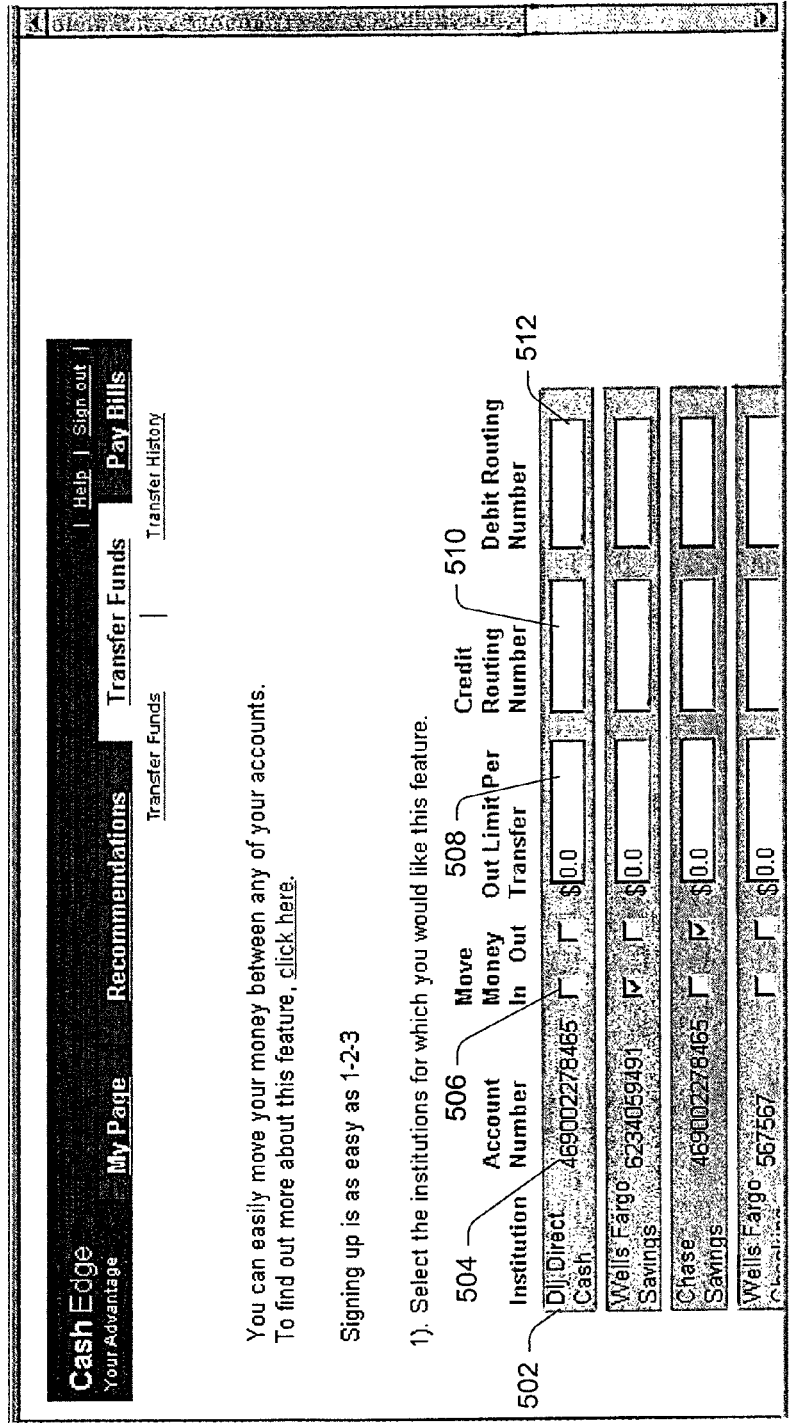
FIGS. 14-15 illustrate exemplary user interface screens illustrating various account entry fields and account recommendations.
Figure 15:
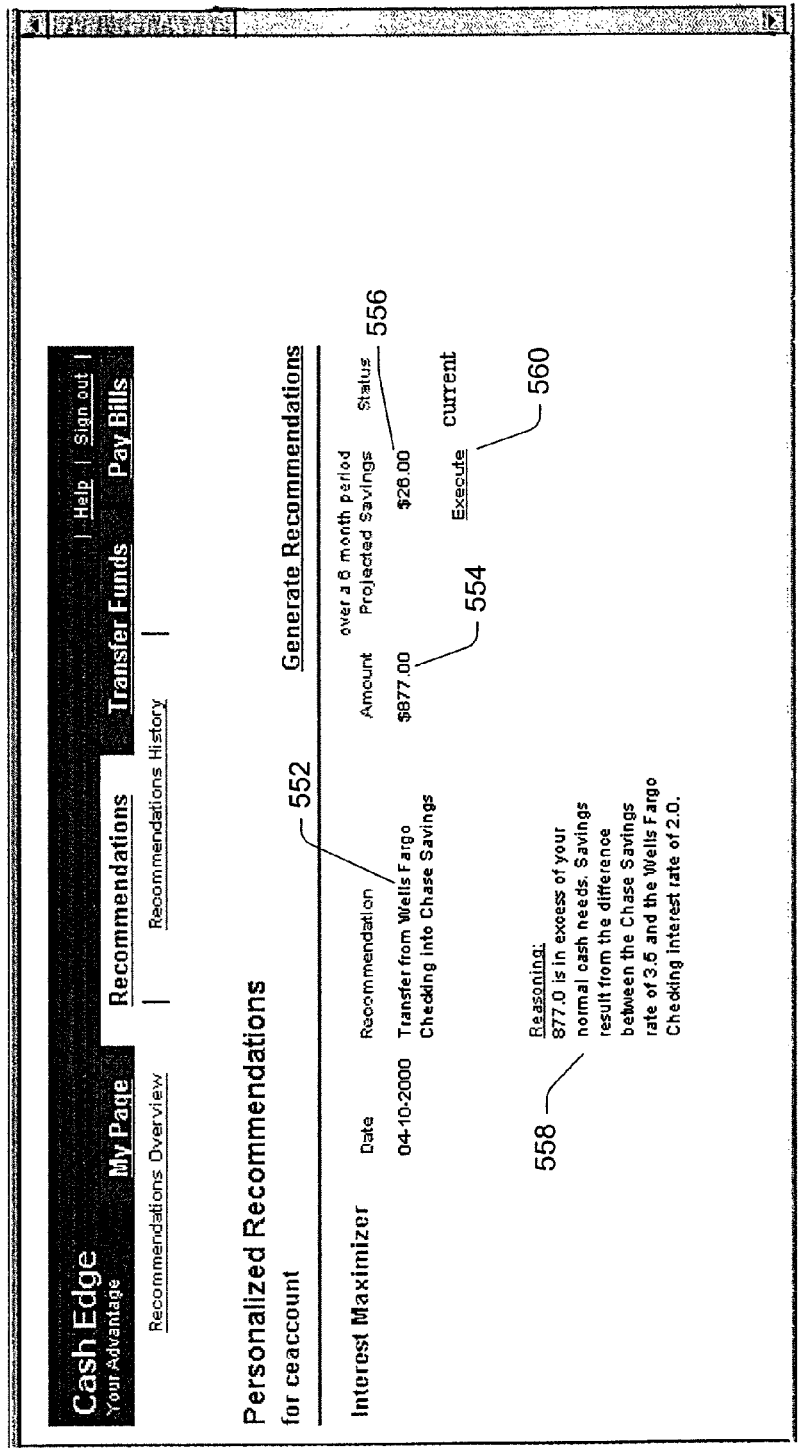

FIGS. 14-15 illustrate exemplary user interface screens illustrating various account entry fields and account recommendations. FIG. 14 illustrates an example screen 500 generated by a web browser or other application that allows a user to enter account information and preferences. Each entry identifies an institution 502 associated with the account and an account number 504. The user may select whether the financial management system has access to move funds into the account, out of the account, or both, by selecting the appropriate check boxes 506. The user may also set a maximum amount that can be withdrawn from the account at a particular time or during a particular time period by entering the amount in field 508. The credit routing number for the account is entered in field 510 and the debit routing number for the account is entered in field 512.

Although not shown in FIG. 14, other fields may be provided in the user interface to allow the user to enter additional preferences or information, such as interest rate, minimum balance the user wants maintained, etc. Certain account information (such as interest rate and routing numbers) may be obtained from the bank directly, thereby minimizing the information required to be entered by the user.

FIG. 15 illustrates another example screen 550 generated by a web browser or other application that allows a user to review recommendations generated by the financial management system. In the example of FIG. 15, one recommendation 552 is shown—to transfer funds from the Wells Fargo Checking account into the Chase Savings account. A recommended amount to transfer 554 has also been identified. If the recommendation is executed, the projected savings 556 over the next six months is $26. The reasoning or analysis supporting the recommendation and the projected savings is provided at 558. The user can execute the recommendation by activating the "Execute" button 560 on the screen. After activating the "Execute" button, the financial management system automatically performs the necessary steps to transfer the recommended funds between the two accounts.

In an alternate embodiment, the user is given the option to modify the amount to be transferred between the two accounts. For example, the user may only want to transfer $500 instead of the recommended $877. In this situation, the financial management system is still able to automatically perform the steps necessary to transfer $500 between the two accounts.

The systems and procedures discussed perform various financial analysis and generate one or more financial recommendations. To implement the financial recommendations, such as transferring funds between accounts, one or more of the systems and/or procedures discussed below may be utilized. Furthermore, the systems and procedures discussed below can be used to transfer funds between accounts at the user's request, and not necessarily based on any financial analysis or financial recommendations. For example, the user may want to transfer funds between two accounts in anticipation of a known withdrawal from the account receiving the funds. Thus, the systems and procedures discussed below are useful to transfer funds between accounts for any reason.

Figure 16:
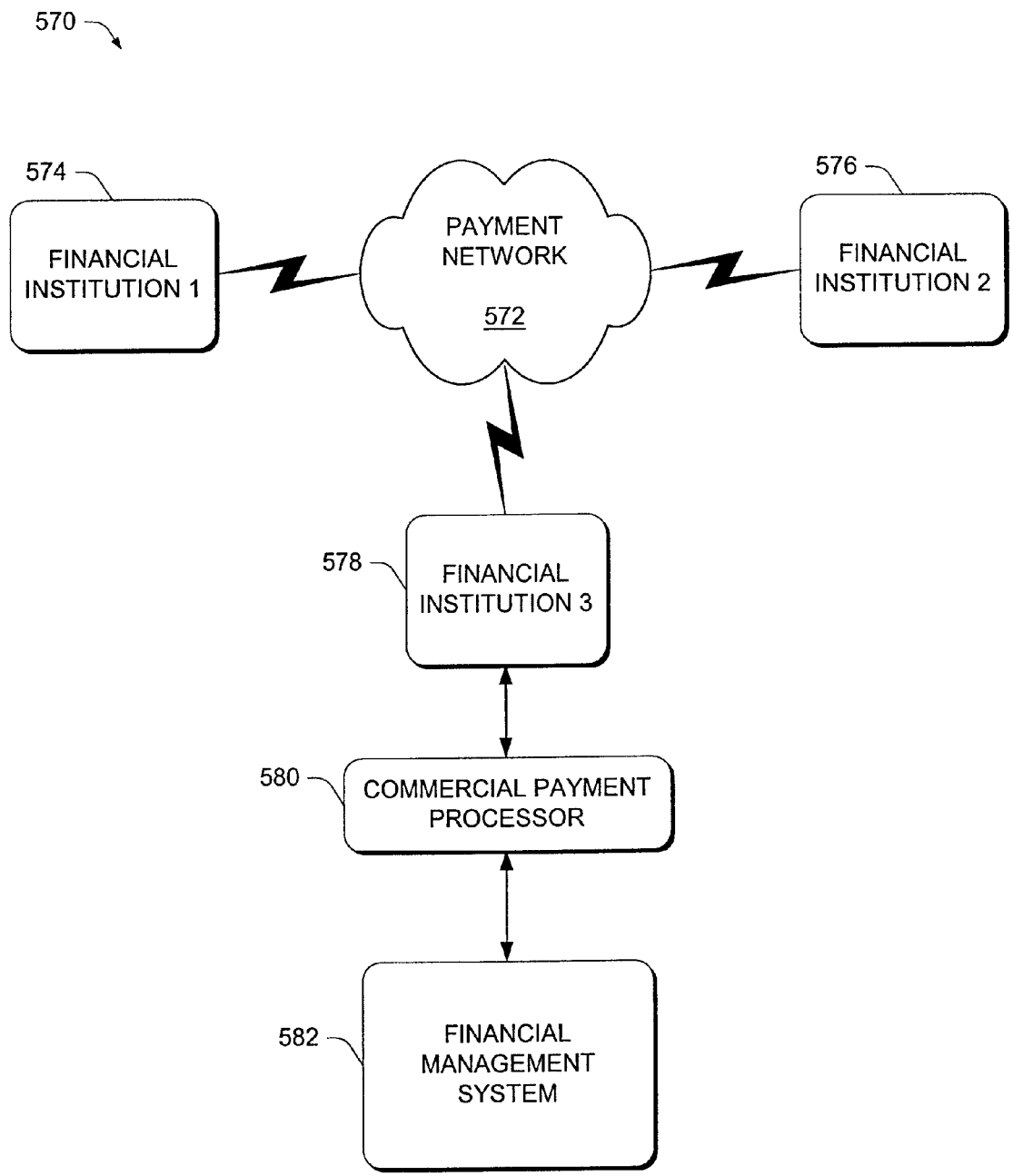
FIG. 16 illustrates an exemplary environment in which funds are transferred between various financial institutions using a payment network.

FIG. 16 illustrates an exemplary environment 570 in which funds are transferred between various financial institutions using a payment network 572. Payment network 572 can be, for example, an ACH network, a debit network, a credit card network, or a wire transfer network. Three different financial institutions 574, 576, and 578 are coupled to payment network 572, thereby allowing the three financial institutions to exchange funds among one another. A commercial payment processor 580 is coupled to financial institution 578 and a financial management system 582. Financial management system 582 may be similar to the financial management system 220, discussed above. Financial management system 582 is typically a neutral third party that performs various financial transactions on behalf of a user. Thus, financial management system 582 is not necessarily associated with any financial institution.

Financial management system 582 initiates the transfer of funds between financial institutions based on user instructions and/or recommendations based on analysis of the user's accounts. Additionally, financial management system 582 provides a common application or interface for accessing all accounts for a particular user. Thus, the user can access the financial management system 582 in a common manner and retrieve information and execute fund transfers using common commands, etc., regardless of the financial institutions involved. Furthermore, financial management system 582 registers multiple financial accounts for one or more account holders. Thus, financial management system 582 provides a single point for registering multiple financial accounts. A user may register multiple accounts associated with different financial institutions at this single point. After registering all accounts, the user can execute transactions between any of the registered accounts, regardless of whether the accounts are with the same or different financial institutions. Thus, the user is not required to establish account information for every pair of financial institutions that funds may be transferred between. Instead, the user registers the information associated with each account (e.g., account number, bank name, account password, etc.) once, which allows each registered account to exchange funds with any other registered account, regardless of the financial institutions associated with the accounts. The receiving and storing of the registered account information may be performed, for example, by financial management system 582.

Figure 18:
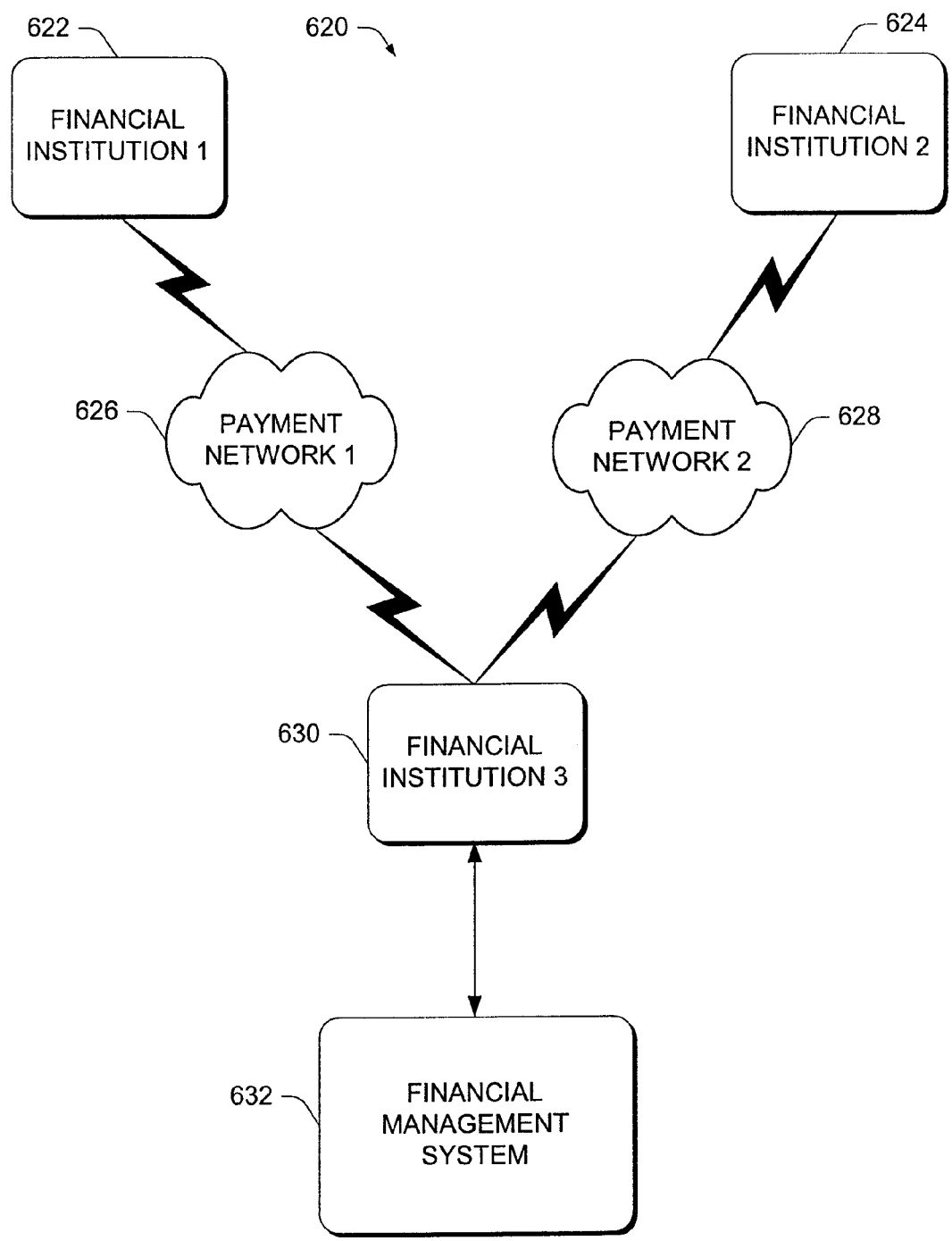
FIG. 18 illustrates another exemplary environment in which funds are transferred between various financial institutions using multiple payment networks.

Although only three financial institutions 574, 576, and 578 are shown in FIG. 18, a particular environment may include any number of financial institutions coupled to payment network 572. Furthermore, as discussed below, the financial institutions 574, 576, and 578 may be coupled to one another via multiple payment networks.

Typically, payment network transactions are performed by financial institutions that are members of the payment network 572. Thus, financial management system 582 is not able to initiate transactions directly on the payment network 572 unless it is a member of the payment network. Instead, financial management system 582 initiates transactions through commercial payment processor 580 and financial institution 578. Financial institution 578 is capable of executing the requested financial transactions using payment network 572. Commercial payment processor 580 provides another interface to the payment network 572.

In an alternate embodiment, payment processor 580 is not required. Instead, financial management system 582 sends instructions directly to financial institution 578, which executes the instructions using payment network 572. In another embodiment, financial institution 578 is not required. Instead, financial management system 582 sends instructions to commercial payment processor 580, which executes the instructions on payment network 572.

Some financial institutions, such as certain brokerage firms and credit unions, are not coupled to the payment network 572. These financial institutions use an intermediate financial institution to gain access to payment network 572. For example, in the environment of FIG. 16, a brokerage firm may gain access to payment network 572 through financial institution 574 or 576.

Figure 17:
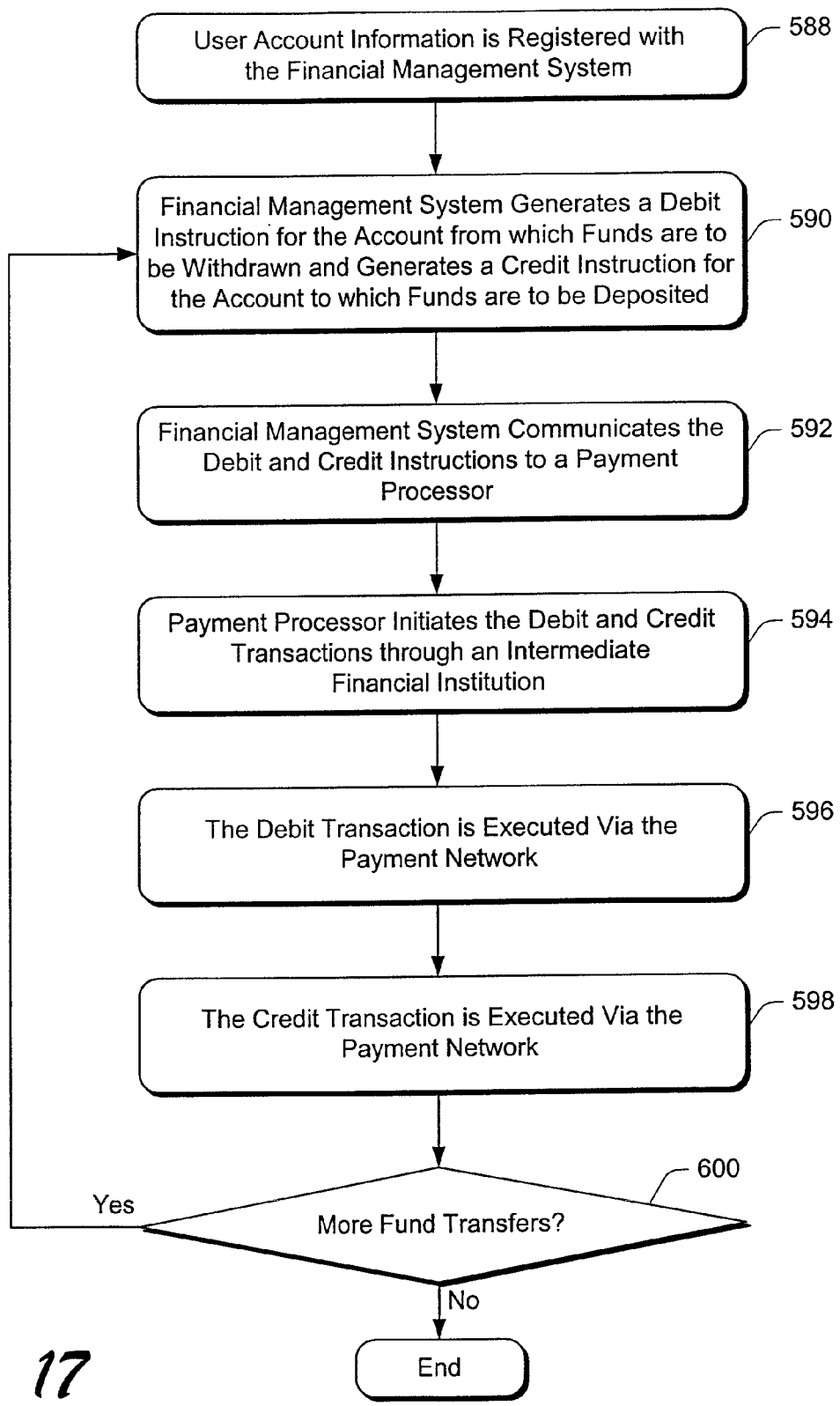
FIG. 17 is a flow diagram illustrating a procedure for transferring funds between two financial institutions.

FIG. 17 is a flow diagram illustrating a procedure for transferring funds between two financial institutions. Initially, a user's account information is registered with the financial management system (block 588). After analyzing a user's asset accounts and/or debt accounts as discussed above (or based on a user's request to transfer funds between two accounts), the financial management system generates a fund transfer instruction (block 590). The fund transfer instruction can be divided into two separate transactions: a debit instruction (for the account from which the funds are to be withdrawn) and a credit instruction (for the account to which the funds are to be deposited). The debit instruction and the credit instruction are communicated to a payment processor (block 592). The payment processor initiates the requested debit and credit transactions through an intermediate financial institution (e.g., financial institution 578 in FIG. 16) that is coupled to the payment network (block 594). The debit transaction and/or the credit transaction can be performed in real-time or deferred. The debit transaction is received and executed by the appropriate financial institution (block 596) and the credit transaction is received and executed by the appropriate financial institution (block 598). If the financial management system has additional fund transfers to execute (block 600), the procedure returns to block 590 to execute the next transfer. The procedure terminates after executing all fund transfers.

For example, in the environment of FIG. 16, the financial management system 582 receives user account information during a user registration process. Next, the financial management system 582 analyzes the user's accounts and determines whether funds should be transferred from the user's checking account at financial institution 574 to the user's savings account at financial institution 576. To initiate this fund transfer, financial management system 582 generates a debit instruction to withdraw the appropriate funds from the user's checking account at financial institution 574. Additionally, financial management system 582 generates a credit instruction to deposit the appropriate funds (equal to the funds withdrawn by the debit instruction) into the user's savings account at financial institution 576. The instructions are then communicated via payment processor 580 and financial institution 578 onto the payment network 572.

Alternatively, fund transfers can occur as one-time transfers initiated by the user (e.g., transfer $500 from the user's savings account to the user's checking account) or as periodic transfers (e.g., transfer $750 from the user's money market account to the user's checking account on the 12th day of each month). Additionally, fund transfers can occur based on one or more rules, such as transfer $600 from the user's savings account to the user's checking account if the checking account balance falls below $300.

FIG. 18 illustrates another exemplary environment 620 in which funds are transferred between various financial institutions using multiple payment networks 626 and 628. In this example, a first financial institution 622 is coupled to payment network 626 and a second financial institution 624 is coupled to payment network 628. A third financial institution 630 is coupled to both payment networks 626 and 628. A financial management system 632 is coupled to financial institution 630. Financial management system 632 is similar to the financial management system 220, discussed above.

If a fund transfer is required between accounts at the two financial institutions 622 and 624, the financial management system 632 generates a fund transfer instruction. The fund transfer instruction may include the account information and financial institution information for the accounts involved, the value to be transferred, and other information. In this example, the transfer instruction is separated into two different transactions: a first transaction that withdraws the appropriate funds from an account at one financial institution and a second transaction that deposits those funds into an account at the second financial institution. Although two different transactions occur, the fund transfer appears as a single transaction to the user or account holder.

The environment shown in FIG. 18 may be referred to as a "hub-and-spoke" arrangement in which financial management system 632 is the "hub", and financial institutions 622 and 624 each represent a "spoke". In alternate embodiments, the environment in FIG. 18 can be expanded to include any number of spokes coupled to any number of financial institutions via any number of payment networks. This configuration allows financial management system 632 to control the execution of transactions between any of the financial institutions.

Figure 19:
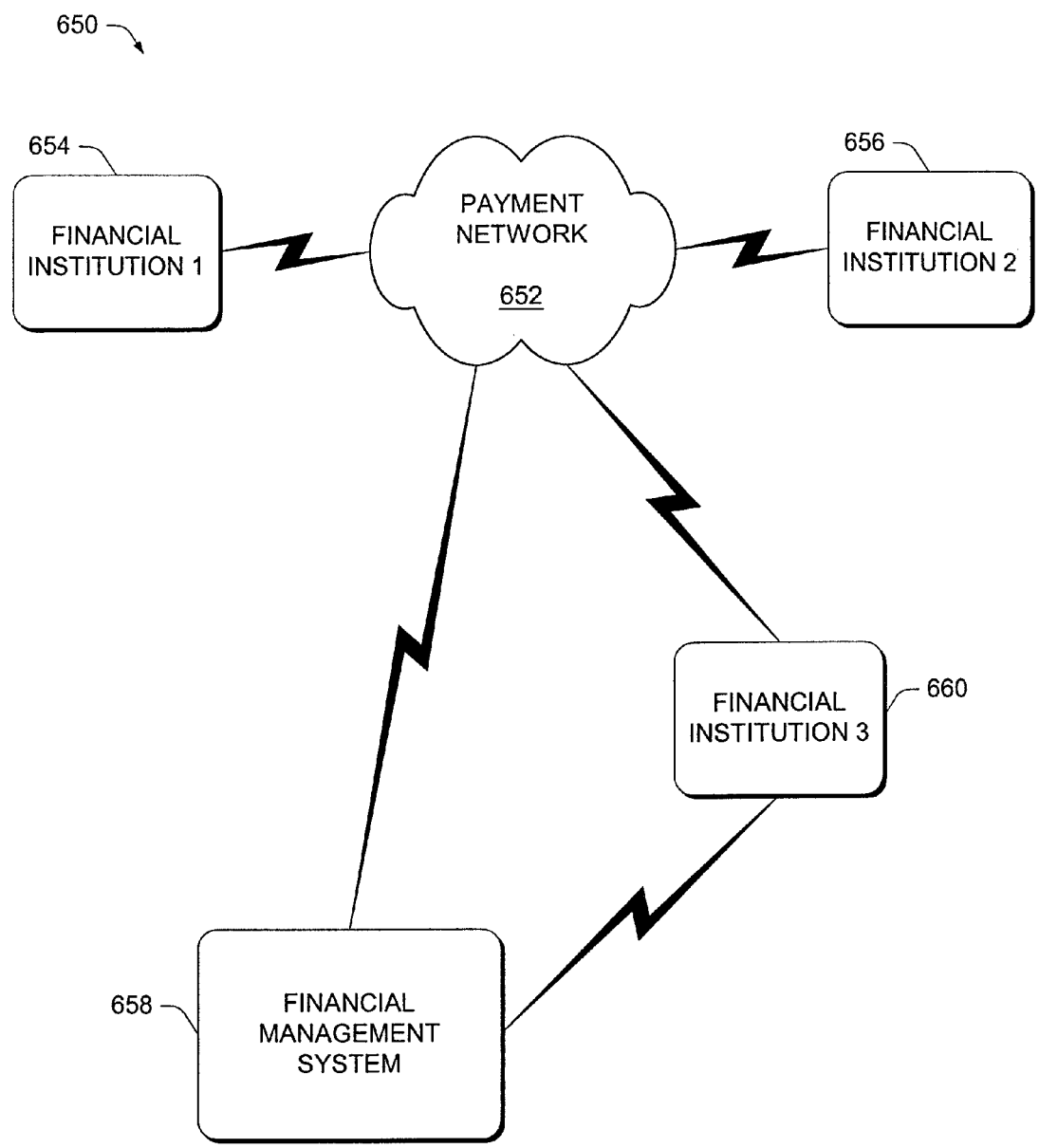
FIG. 19 illustrates another environment in which funds are transferred between various financial institutions.

FIG. 19 illustrates another exemplary environment 650 in which funds can be transferred between various financial institutions using a payment network 652. In this example, a pair of financial institutions 654 and 656 are coupled to the payment network 652. A financial management system 658 is also coupled to the payment network 562 and a third financial institution 660. In this example, the financial management system 658 is capable of executing certain transactions directly on payment network 652, but requires a financial institution (or commercial payment processor) to execute other transactions on payment network 652. Thus, financial institution 660 is utilized for those transactions that cannot be executed directly by the financial management system 652.

Before a user or entity is permitted to execute financial transactions using the financial management system discussed herein, various authentication procedures and/or risk analysis procedures may be performed to prevent unauthorized account access and reduce the risk of allowing a user to execute a high-risk transaction. A high-risk transaction is, for example, a transaction that involves a large amount of money. As mentioned above with respect to FIG. 4, authentication and risk analysis module 240 verifies that the user (or entity) accessing the financial management system is authorized to access a particular account and analyzes the risks associated with allowing a particular user to access the financial management system or execute a particular transaction using the financial management system. Authentication and risk analysis module 240 is capable of collecting and analyzing various information when authenticating a user and analyzing risks. Module 240 provides a flexible analysis and authentication architecture that can be customized to meet the needs of a particular system or organization. Although particular examples discuss the analysis and/or authentication of a user or a user account, the procedures and systems discussed herein can be used to analyze and/or authenticate any entity and any type of account. Further, the procedures and systems discussed herein can be used with any type of transaction, such as transactions between two financial accounts (at the same or different financial institutions), transactions between two individuals (person-to-person), transactions between two merchants (merchant-to-merchant), and transactions between an individual and a merchant (person-to-merchant or merchant-to-person).

Figure 20:
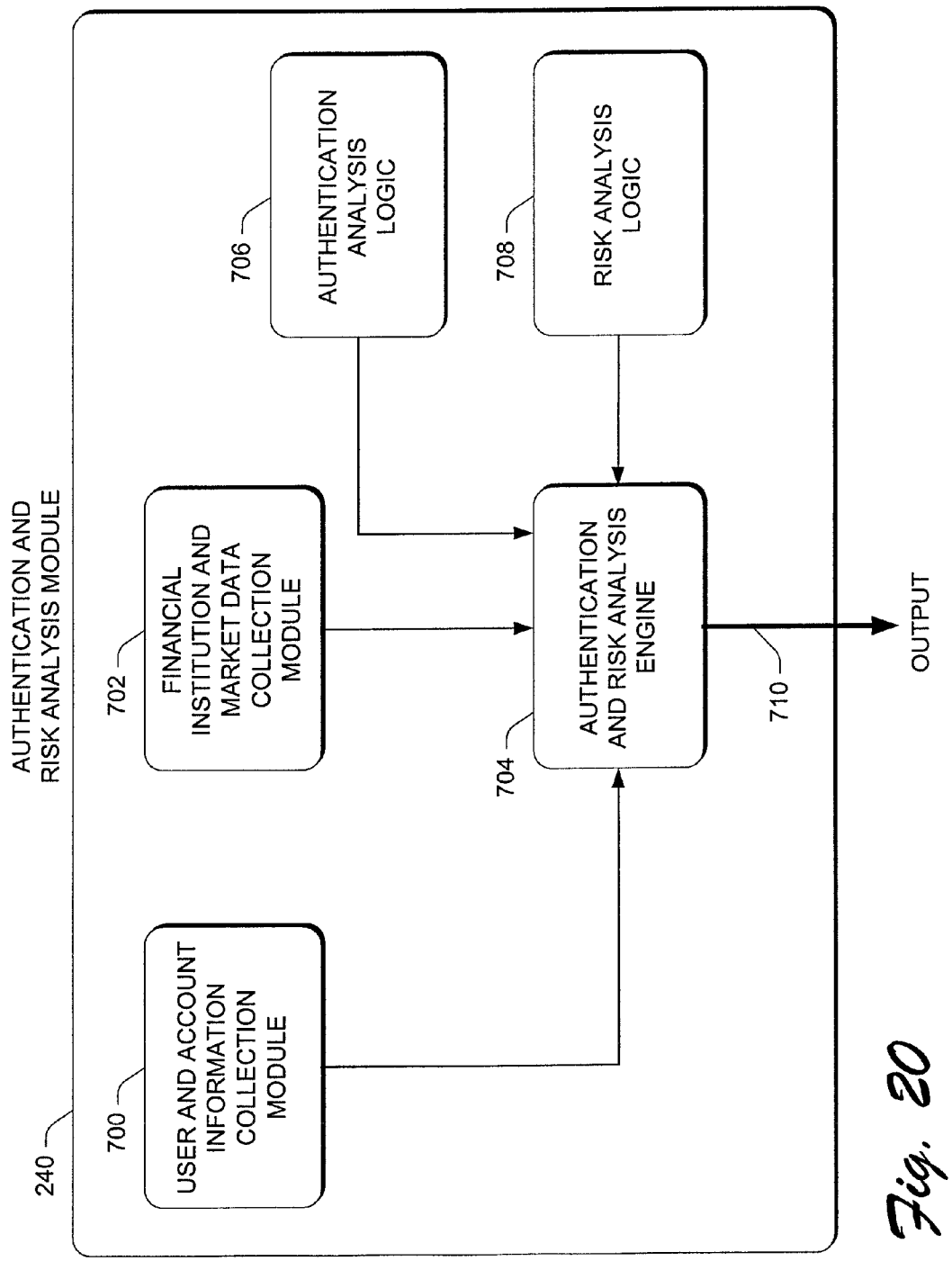
FIG. 20 is a block diagram showing exemplary components and modules of an authentication and risk analysis module.

FIG. 20 is a block diagram showing exemplary components and modules of the authentication and risk analysis module 240. A user and account information collection module 700 collects information about a user as well as the user's financial accounts (e.g., asset accounts and debt accounts). This information may be retrieved directly from the user or may have been previously obtained from the user and stored in the financial management system. After collecting the information about the user and the user's accounts, the collection module 700 organizes the information into a common format and communicates the information to an authentication and risk analysis engine 704.

A financial institution and market data collection module 702 collects information about particular financial institutions and about current market interest rates. The information about financial institutions may be retrieved from the financial institutions themselves or from one or more market information services that provide information about various financial institutions. The information relating to current market interest rates is collected from one or more market information services. After collecting the financial institution information and the market data, collection module 702 communicates the collected information and data to the authentication and risk analysis engine 704.

An authentication analysis logic 706 defines a set of logic rules and/or procedures used to authenticate a particular user. A risk analysis logic 708 defines a set of logic rules and/or procedures used to analyze the risk associated with a particular user or a particular action, such as a transfer of funds between accounts. Additional details regarding the authentication of users and analyzing the risk associated with a user or action are provided below.

Authentication and risk analysis engine 704 authenticates a particular user by applying the authentication analysis logic 706 to the information collected about the user. Authentication and risk analysis engine 704 also analyzes the risk associated with a particular user or a particular action by applying the risk analysis logic 708 to the information collected about the user, the user's accounts, and the particular action requested by the user. After analyzing the information and logic mentioned above, the authentication and risk analysis engine 704 generates one or more determinations regarding whether the user is authenticated and the risk associated with the user and the particular action. These determinations are output on a communication link 710 for use by other modules or components in the financial management system.

Figure 21:
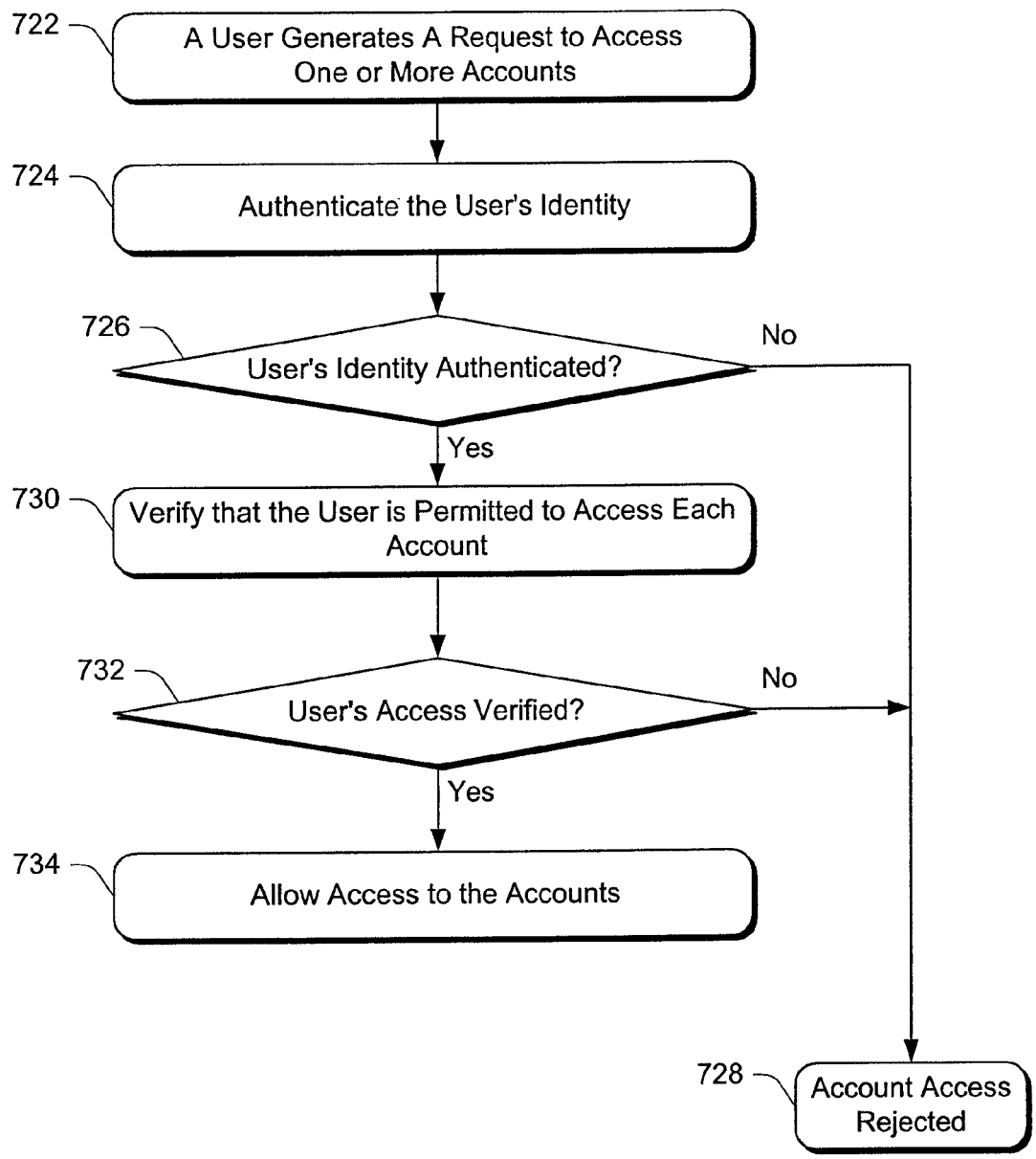
FIG. 21 is a flow diagram illustrating a procedure for authenticating a user's identity.

FIG. 21 is a flow diagram illustrating a procedure for authenticating a user's identity. The procedure illustrated in FIG. 21 may be performed, for example, by authentication and risk analysis module 240. Initially, a user generates a request to access one or more accounts using the financial management system discussed herein (block 722). For example, the user may want to transfer funds between two financial accounts. The procedure then authenticates the user's identity (block 724). The procedure authenticates the user's identity by receiving authenticating information from the user. Examples of authenticating information include name, address, social security number, and the like.

If the user is establishing access to a new account, the user's identity may be authenticated by collecting and verifying various information about the user. Example information includes the user's name, address, social security number, and driver's license number. This information can be verified using a driver's license datasource, a phone datasource and/or a credit reporting database, such as the credit information services available from Equifax Inc. of Atlanta, Ga.

When authenticating a user, additional information may be received (e.g., from a credit reporting database or other source). This additional information may include verifying that the user is at least 18 years old. The system may also check the social security files for numbers assigned to deceased persons, numbers reported missing, or numbers that were never issued. The user's phone number area code is compared with the user's state of residence for further verification. The user's current address and the user's previous address can be verified as valid mailing addresses using a credit reporting agency database and/or address updates provided by the United States Postal Service (USPS). Credit reporting agencies may access other sources such as utility bill or telephone bill databases that contain information reported by the providers of those services. The driver's license address may also be verified and compared to the format used in the state of issue. Any of the verification methods mentioned herein may be used alone or in combination with other verification methods to authenticate a user's identity.

Additionally, as part of authenticating the user's identity, the system may consider whether the same address has been used multiple times by individuals with different social security numbers or if the same address was used multiple times by individuals with different last names. Multiple attempts to register for a particular service (such as a financial service) by the same individual may also be considered in authenticating a user's identity. Also, a user's identity may be authenticated by validating an email address provided by the user. Any one or more authentication procedures can be used to verify a particular user's identity.

In one implementation any one or more of the following situations will result in declining a user's request to access accounts:

User's profile includes a fraud victim indicator warning
User's social security number was never issued
User's social security number belongs to a deceased individual
User's social security number has been reported misused
User's address is a storage facility, mail receiving service, post office, check cashing facility, telephone answering service
User's address is a campground or hotel/motel
User's address is a state or federal prison or detention facility
User's address has been reported misused
User's supplied address is not verified
User's telephone number has been reported misused
User's telephone number is a phone booth or is a non-residential phone number
User's credit profile contains a true name fraud warning
User could not be verified by credit reporting service Referring again to FIG. 21, the procedure determines whether the user's identity has been authenticated; i.e., whether the authenticating information is correct and/or valid (block 726). In a particular implementation, this determination is performed using an authentication assessment algorithm or application, such as the eID$^{verifier}$ software product available from ESI (Equifax Secure Inc.) of Atlanta, Ga. The eID$^{verifier}$ software generates a score based on the level of verification attained. This score may be referred to as a "confidence code". A higher score indicates a higher level of verification (i.e., a higher level of confidence). If the software generates a score above a pre-defined threshold, the user is verified. If the score does not meet the pre-defined threshold, then the user is not verified. This threshold may be adjustable based on the level of verification desired by the operator of the financial management system. In another embodiment, a user with a score near the pre-defined threshold may be verified, but limited to a restricted level of service (e.g., only approved for transactions less than $1000, or only approved for one transaction per business day). Later, if the user is verified at a higher level, the restricted level of service may be changed to an unrestricted service level.

Alternate verification procedures include requiring the user to submit a copy of their phone bill and a current bank statement or utility bill to verify their identity and authorization to access particular bank accounts.

If the user's identity is not authenticated, the procedure of FIG. 21 rejects the requested account access (block 728). If the user's identity is authenticated at block 726, the procedure continues to block 730, which verifies that the user is permitted to access each account. This verification is described below with reference to FIG. 22. If the user's access to one or more accounts is not verified, the procedure rejects the requested account access (block 728). If access to the accounts is verified, the procedure allows the user's access to the accounts (block 734).

Figure 22:
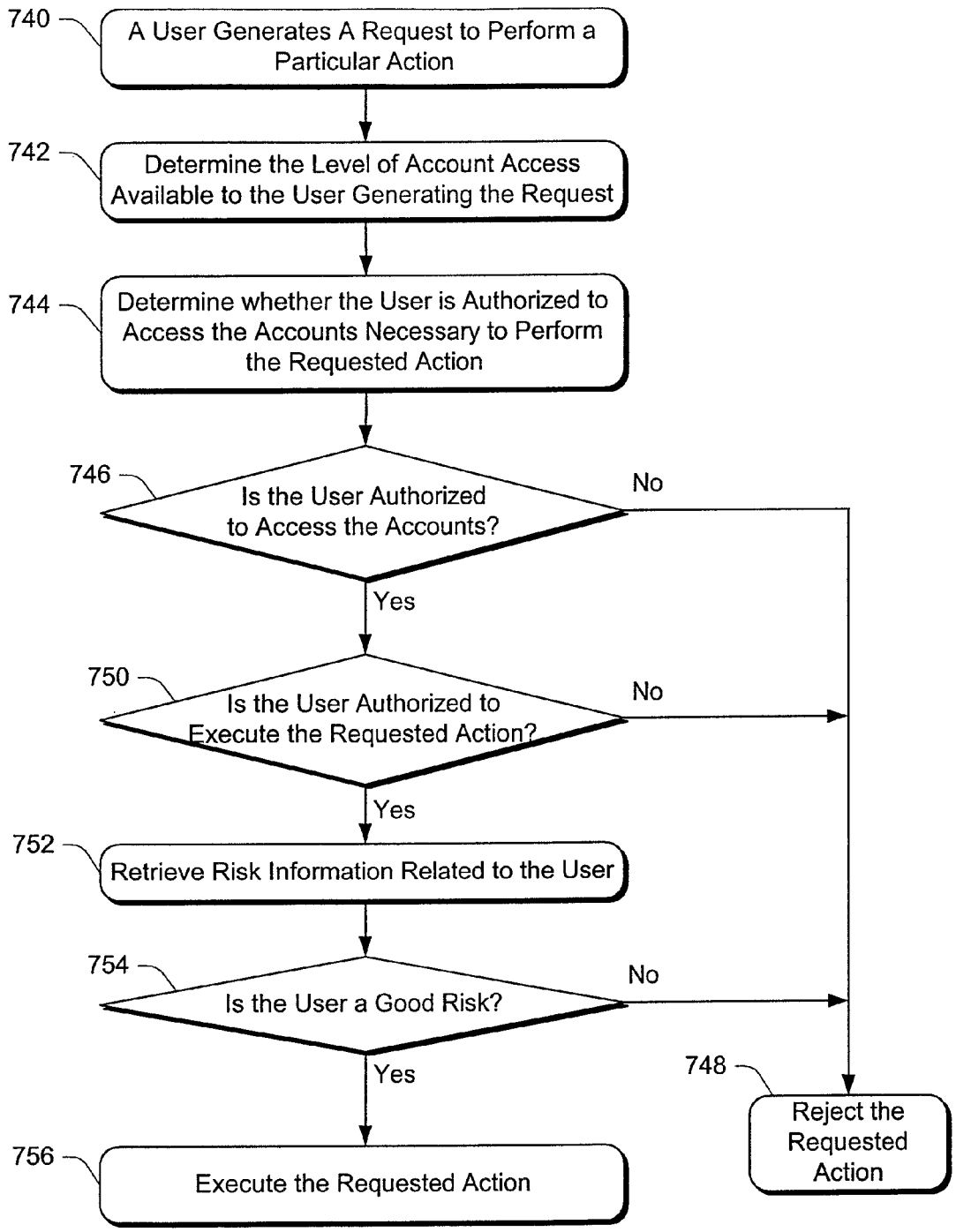
FIG. 22 is a flow diagram illustrating a procedure for verifying the account access rights of a particular user and analyzing risks associated with the particular user.

FIG. 22 is a flow diagram illustrating a procedure for verifying the account access rights of a particular user and analyzing risks associated with the particular user. The procedure of FIG. 22 can be implemented, for example, by authentication and risk management module 240. Initially, a user generates a request to perform a particular action (block 740). The procedure then determines the level of account access available to the user generating the request (block 742). This level of account access is determined, for example, when a user is authenticated. At block 744, the procedure determines whether the user is authorized to access the accounts necessary to perform the requested action.

This determination may be performed using an online verification process, a test transfer process, or by providing a voided check or account statement for the account being accessed. Additionally, the authorizing a user's right to access an account may be performed using a trusted third party (e.g., a trusted database of user account information) or by the financial institution associated with the account being authorized. The online verification process requires the user to enter their username and password for the account being accessed. Online verification is then performed by validating the user's account information from the financial institution.

For example, information may be "harvested" or "scraped" from one or more web pages based on user-provided account access information. This method of obtaining information is referred to as "data harvesting" or "screen scraping". Data harvesting allows a script (or other process) to retrieve data from a web site. The data harvesting procedure is capable of navigating web sites and capturing data from individual HTML (hypertext markup language) pages. A parser extracts specific data (such as account balance or account holdings) from the individual HTML pages. This extracted data is used (individually or in combination with other information) to validate an account and/or a user requesting a transaction associated with the account.

Instead of "harvesting" or "scraping" data from a web page, data may also be retrieved from other financial data sources. For example, data can be received from a source that supports the Open Financial Exchange (OFX) specification or the Quicken Interchange Format (QIF). OFX is a specification for the electronic exchange of financial data between financial institutions, businesses and consumers via the Internet. OFX supports a wide range of financial activities including consumer and business banking, consumer and business bill payment, bill presentment, and investment tracking, including stocks, bonds, mutual funds, and 401(k) account details. QIF is a specially formatted text file that allows a user to transfer Quicken transactions from one Quicken account register into another Quicken account register or to transfer Quicken transactions to or from another application that supports the QIF format.

If the online verification process fails, the user is asked to proceed with the test transfer process or provide a voided check for the account. Similarly, if the financial institution's online service is temporarily unavailable, another process may be used to authorize the user's access to the account. In a particular situation, any one or more of the above processes can be used to authorize a user's right to access a financial account or perform a particular action.

Using the test transfer process mentioned above, the financial management system makes one or more deposits (or withdrawals) of random amounts to the account provided by the user. The test transfer process identifies the correct network routing numbers and parameters associated with the financial institution maintaining the account. These network routing numbers and parameters are used in subsequent transactions that involve the account. The user is then requested to verify the amount of the deposits (or withdrawals) using their monthly paper statement, their online account statement, or by contacting their financial institution. If the amounts provided by the user match the actual deposit amounts, the user may be authorized to access the account and execute financial transactions with respect to that account.

Providing a voided check for the account is another way for a user to indicate that they are authorized to access the account. If there is any significant difference between the information provided by the user and the information contained on the voided check, the user is not authorized to access the account. Significant differences include, for example, different first or last name, different address, alteration of the name or address on the check, or inconsistent routing and/or check numbers.

Referring again to FIG. 22, if the user is not authorized to access the accounts or the user is not authorized to execute the requested action, the requested action is rejected (block 748). If the requested action is rejected, the user may be provided with a reason for the rejection (e.g., not authorized to access one of the accounts involved in the requested action), thereby allowing the user to correct the reason for the rejection.

If the user is authorized to access the account and to execute the requested action, the procedure retrieves risk information related to the user (block 752). To help analyze risks associated with particular users, certain information is recorded on an ongoing basis. For example, the dollar amount and movement of funds between user accounts is monitored, including the overall behavior of the user as it relates to the funds transfer service. The success rate of the transaction and the type of failures is monitored and used to predict future behavior and/or future results. The recorded information is then used to manage risk by increasing or decreasing transaction dollar limits and increasing or decreasing the number of settlement days associated with the transaction. For example, a user determined to be a higher risk may have a decreased dollar limit on each transaction and may experience a longer settlement period than a user determined to be a lower risk.

The system may also monitor the available average account balance for each of the user's accounts. This average balance information can be used as part of the risk management decision. As a particular user makes transactions, the system retrieves the user's transaction history (e.g., over the past three months or six months) as well as the most recent (e.g., over the past 3-5 days) transactions. The system interprets the patterns embedded in the previous transactions and responds by identifying abnormal areas that may indicate increased risk. For example, if the user has been making transfers of $200-300 between accounts and then adds a new account and requests a $5000 transfer, the system will signal an abnormal request because this request does not match the previous behavior. A customer service agent may then contact the customer to obtain a verbal confirmation. Alternatively, the settlement date may be extended to ensure that the transaction is completed properly or the transaction may be refused if the risk is too high.

The procedure then determines whether the user is a good risk (block 734) by analyzing the information collected and identifying unusual patterns in the information or the current transaction request.

If the procedure determines that the user is not a good risk, the procedure rejects the requested action (block 748). Otherwise, the procedure continues to block 756, which executes the requested action. Although the requested action is executed, certain conditions (such as changing the settlement date or limiting the transaction dollar amount) may be placed on the transaction depending on the risk level, as discussed above. The procedure illustrated in FIG. 22 may be repeated in response to each user request to perform a particular action.

Thus, a system and method has been described that analyzes multiple user accounts to determine whether those accounts are optimized, or close to optimized, and adjusts accounts based on this analysis or based on instructions from the user. This system provides a single point of registration for a user to register all financial accounts. The system also provides a common login process and common log of transactions relating to all registered accounts. Further, the system authenticates a user's identity and verifies that the user is authorized to access particular accounts and perform certain actions related to those accounts. The system also determines whether the user, the accounts, and the requested action represent a good financial risk.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, the method comprising:
   directing, by a financial management system comprising one or more computers, a first transfer associated with a financial account of a user;

requesting, by a financial management system, that the user identify an amount of the first transfer;

receiving, by the financial management system, a response from the user comprising an identification of the amount of the first transfer;

confirming, by the financial management system, the user's ability to access the financial account if the identification of the amount of the first transfer is correct;

denying, by the financial management system, the user's ability to access the financial account if the identification of the amount of the first transfer is not correct;

directing, by the financial management system, a second transfer associated with the financial account;

requesting, by the financial management system, that the user identify an amount of the second transfer;

harvesting, by the financial management system, data from a web page associated with the financial account; and authenticating, by the financial management system, the user's ability to access the financial account based at least in part on the data harvested from the web page associated with the financial account.

2. The method as recited in claim 1, wherein the first transfer is a credit transfer.

3. The method as recited in claim 1, wherein the first transfer is a debit transfer.

4. The method as recited in claim 1, further comprising confirming, by the financial management system, the user's ability to access the financial account if the identification of the amount of the first transfer and an identification of the amount of the second transfer are correct.

5. The method as recited in claim 1, further comprising retrieving, by the financial management system, data from a financial data server associated with the financial account and authenticating the user's ability to access the financial account based at least in part on data retrieved from the financial data server associated with the financial account.

6. A system, comprising:
   at least one memory that stores computer-executable instructions; and
   at least one processor to access the at least one memory, wherein the at least one processor executes the computer-executable instructions to:
   direct a first transfer associated with a financial account of a user;
   request that the user identify an amount of the first transfer;
   receive a response from the user comprising an identification of the amount of the first transfer;
   confirm the user's ability to access the financial account if the identification of the amount of the first transfer is correct;
   deny the user's ability to access the financial account if the identification of the amount of the first transfer is not correct;
   direct a second transfer associated with the financial account;
   request that the user identify an amount of the second transfer;
   harvest data from a web page associated with the financial account; and,
   authenticate the user's ability to access the financial account based at least in part on the data harvested from the web page associated with the financial account.

7. The system as recited in claim 6, wherein the first transfer is a credit transfer.

8. The system as recited in claim 6, wherein the first transfer is a debit transfer.

9. The system as recited in claim 6, wherein the at least one processor further confirms the user's ability to access the financial account if the identification of the amount of the first transfer and an identification of the amount of the second transfer are correct.

10. The system as recited in claim 6, wherein the at least one processor further retrieves data from a financial data server associated with the financial account and authenticating the user's ability to access the financial account based at least in part on data retrieved from the financial data server associated with the financial account.

\* \* \* \* \*